(12) United States Patent
Shaban et al.

(10) Patent No.: US 10,951,286 B2
(45) Date of Patent: Mar. 16, 2021

(54) METHODS AND SYSTEMS FOR HYBRID BEAMFORMING FOR MIMO COMMUNICATIONS

(71) Applicants: Ahmed Wagdy Abdelwahab Shaban, Waterloo (CA); Mohamed Oussama Damen, Waterloo (CA); Yan Xin, Ottawa (CA); Kwok Shum Au, Ottawa (CA)

(72) Inventors: Ahmed Wagdy Abdelwahab Shaban, Waterloo (CA); Mohamed Oussama Damen, Waterloo (CA); Yan Xin, Ottawa (CA); Kwok Shum Au, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/396,371

(22) Filed: Apr. 26, 2019

(65) Prior Publication Data

US 2020/0343948 A1 Oct. 29, 2020

(51) Int. Cl.
*H04B 7/06* (2006.01)
*H04B 7/08* (2006.01)
(Continued)

(52) U.S. Cl.
CPC ......... *H04B 7/0617* (2013.01); *H04B 7/0417* (2013.01); *H04B 7/0456* (2013.01); *H04B 7/0868* (2013.01); *G06F 17/141* (2013.01)

(58) Field of Classification Search
CPC .. H04B 7/0617; H04B 7/0417; H04B 7/0456; H04B 7/0868; G06F 17/141
See application file for complete search history.

(56) References Cited

U.S. PATENT DOCUMENTS

2013/0202054 A1 8/2013 Khan et al.
2014/0050280 A1 2/2014 Stirling-Gallacher et al.
(Continued)

FOREIGN PATENT DOCUMENTS

| CN | 104506281 A | 4/2015 |
|---|---|---|
| CN | 105306125 A | 2/2016 |
| CN | 105429686 A | 3/2016 |

OTHER PUBLICATIONS

A. Alkhateeb, O. El Ayach, G. Leus, and R. W. Heath, Channel estimation and hybrid precoding for millimeter wave cellular systems, IEEE Journal of Selected Topics in Signal Processing, vol. 8, No. 5, pp. 831-846, 2014. 2014.
(Continued)

*Primary Examiner* — Andrew Lai
*Assistant Examiner* — Harry H Kim

(57) ABSTRACT

Methods and apparatuses for hybrid beamforming are described. The described methods and apparatuses related to hybrid beamforming for single user multiple-input multiple-output (SU MIMO) communications and for multi-user multiple-input single-output (MU MISO) communications. The radio frequency (RF) precoder and baseband precoder are determined such that the hybrid precoder has a minimum or near minimum chordal distance from an optimal precoder. Feedback information enables the transmitter to select columns from a set of discrete Fourier transform (DFT) columns to form the RF precoder matrix.

17 Claims, 12 Drawing Sheets

(51) Int. Cl.
  *H04B 7/0456* (2017.01)
  *H04B 7/0417* (2017.01)
  *G06F 17/14* (2006.01)

(56) References Cited

U.S. PATENT DOCUMENTS

2014/0334564 A1* 11/2014 Singh .................. H04B 7/0617
  375/267
2016/0353294 A1* 12/2016 Wang ..................... H04B 7/086
2020/0136691 A1* 4/2020 Li ........................ H04B 7/0617

OTHER PUBLICATIONS

El Ayach, Omar, et al. "Spatially sparse precoding in millimeter wave MIMO systems." IEEE Transactions on Wireless Communications 13.3 (2014): 1499-1513. 2014.

J. Song, J. Choi, and D. J. Love, "Codebook design for hybrid beamforming in millimeter wave systems," in Communications (ICC), 2015 IEEE International Conference on. IEEE, 2015, pp. 1298-1303. 2015.

A. Adhikary, J. Nam, J.-Y. Ahn, and G. Caire, "Joint spatial division and multiplexingthe large-scale array regime," IEEE Transactions on Information Theory, vol. 59, No. 10, pp. 6441-6463, 2013 2013.

D. J. Love and R. W. Heath, "Limited feedback unitary precoding for spatial multiplexing systems," in IEEE Transactions on Information Theory, vol. 51, No. 8, pp. 2967-2976, Aug. 2005 2005.

L. Liang, W. Xu and X. Dong, "Low-Complexity Hybrid Precoding in Massive Multiuser MIMO Systems," in IEEE Wireless Communications Letters, vol. 3, No. 6, pp. 653-656, Dec. 2014 2014.

D. Ying, F. W. Vook, T. A. Thomas and D. J. Love, "Hybrid structure in massive MIMO: Achieving large sum rate with fewer RF chains," 2015 IEEE International Conference on Communications (ICC), London, 2015 2015.

W. Tan, M. Matthaiou, S. Jin and X. Li, "Spectral Efficiency of DFT-Based Processing Hybrid Architectures in Massive MIMO," in IEEE Wireless Communications Letters, vol. 6, No. 5, pp. 586-589, Oct. 2017 2017.

* cited by examiner

1: Input: $F_{opt}, D_M, D_{N_{rf}}$

2: $Y = D_M^H F_{opt}$

3: $Indices_{RF} = \underset{N_{rf}}{\arg\max}\{diag(YY^H)\}$

4: $F_{RF} = D_M(:, Indices_{RF})$

5: $Z = (F_{RF} D_{N_{rf}})^H F_{opt}$

6: $Indices_{BB} = \underset{N_s}{\arg\max}\{diag(ZZ^H)\}$

7: $F_{BB} = D_{N_{rf}}(:, Indices_{BB})$

8: Return: $Indices_{RF}, Indices_{BB}$

FIG. 5

1: Input: $\boldsymbol{F}_{opt}, \boldsymbol{D}_M$

2: $\boldsymbol{Y} = \boldsymbol{D}_M^H \boldsymbol{F}_{opt}$

3: $Indices_{RF} = \underset{N_{rf}}{\arg\max} \{diag(\boldsymbol{Y}\boldsymbol{Y}^H)\}$ 4: $\boldsymbol{F}_{RF} = \boldsymbol{D}_M(:, Indices_{RF})$ 5: $\boldsymbol{F}_{BB} = \boldsymbol{F}_{RF}^H \boldsymbol{F}_{opt}$ 6: Return: $Indices_{RF}, \boldsymbol{F}_{BB}$

FIG. 6

1: Input: $h_k, D_M$

2: $Y = D_M^H h_k$

3: $Indices_{RF} = \underset{L}{\arg\max}\{diag(YY^H)\}$

4: Return: $Indices_{RF}$

FIG. 8

METHODS AND SYSTEMS FOR HYBRID BEAMFORMING FOR MIMO COMMUNICATIONS

FIELD

The present disclosure relates to methods and systems for hybrid beamforming, which may be suitable for multiple-input multiple-output (MIMO) communications including massive MIMO communications.

BACKGROUND

Millimeter-wave (mmWave) technology has been of recent interest for achieving high data rate wireless links and fulfilling the exigent requirements of increasingly bandwidth-hungry data applications. However, mmWave systems have the potential for significant path losses compared to lower frequency band systems.

Massive multiple-input multiple-out (MIMO) technology has been proposed as a solution to overcome such shortcomings of mmWave systems. The small wavelengths of mmWave systems help to facilitate the utilization of massive MIMO technology. The short wavelength allows the size of the antennas (also referred to as radiating elements or radiators) in an antenna array to be relatively small, thus enabling a large number of antennas to be implemented in an antenna array that can be easily embedded into both transmitter and receiver terminals. The use of massive MIMO technology, particularly in mmWave systems, may help to compensate for link loss in mmWave communications by employing a large number of antennas at each terminal to provide high antenna gain and thus help increase the received signal to noise power ratio (SNR).

However, implementation of massive MIMO may incur significant operational cost by requiring the use of a large number of radio frequency (RF) chains and also requiring significant overhead for channel feedback and beamforming (BF) training.

Hybrid BF technology, which combines digital precoding in the baseband domain with analog BF in the RF domain, has been of interest for reducing the number of RF chains. However, current designs of hybrid beamformers may require significant resources to communicate feedback about the channel condition between the hybrid BF receiver and the transmitter terminals. For example, a current hybrid beamformer design may require instantaneous and perfect channel state information at the transmitter terminal, which means that significant resources may be consumed by the communication of feedback from the receiver terminal.

Accordingly it would be useful to provide a design for hybrid beamforming that operates using more limited feedback.

SUMMARY

In some aspects, the present disclosure describes a method at a receiver terminal for implementing single user multiple-input multiple-output (SU MIMO) communications with a transmitter terminal. The method includes determining a radio frequency (RF) precoder matrix and a baseband precoder matrix for implementing a hybrid precoder at the hybrid BF transmitter terminal. The method also includes transmitting feedback information about the determined RF precoder matrix and the determined baseband precoder matrix to the hybrid BF transmitter terminal, the feedback information including at least information indicating one or more selected columns from a first set of discrete Fourier transform (DFT) columns to enable the hybrid BF transmitter terminal to form the RF precoder matrix using the one or more selected columns.

In any of the above, the RF precoder matrix may be determined such that the hybrid precoder has a minimum or near minimum chordal distance from an optimal precoder matrix.

In any of the above, the RF precoder matrix may be determined by selecting, from the first set of DFT columns, one or more RF precoder columns along which the optimal precoder matrix has a maximum projection. The feedback information about the determined RF precoder matrix may be a first set of indices indicating the selection from the first set of DFT columns.

In any of the above, the baseband precoder matrix may be determined by selecting, from a set of linear combinations of the RF precoder columns, one or more baseband precoder columns associated with the linear combinations along which the optimal precoder matrix has a maximum projection.

In any of the above, the set of the linear combinations of the RF precoder columns may be determined by projecting a second set of DFT columns onto the RF precoder matrix. The feedback information about the determined baseband precoder matrix may be a second set of indices indicating a selection of columns from the second set of DFT columns.

In any of the above, the baseband precoder matrix may be determined by calculating a least square solution for a maximum projection of the optimal precoder matrix onto the RF precoder matrix. The feedback information about the determined baseband precoder matrix may be the determined baseband precoder matrix.

In any of the above, the method may further include determining the optimal precoder matrix.

In some aspects, the present disclosure describes a method at a hybrid BF transmitter terminal for implementing single user multiple-input multiple-output (SU MIMO) communications with a hybrid BF receiver terminal. The method includes: receiving, from the hybrid BF receiver terminal, feedback information to enable the hybrid BF transmitter terminal to implement a hybrid precoder using a radio frequency (RF) precoder matrix and a baseband precoder matrix; forming the RF precoder matrix and the baseband precoder matrix using the feedback information, wherein the feedback information indicates one or more selected columns which have been selected by the hybrid BF receiver terminal from a first set of DFT columns, and the RF precoder matrix is formed using the one or more selected columns; and implementing the hybrid precoder using the RF precoder matrix at an analog RF precoder and the baseband precoder matrix at a digital baseband precoder, to perform hybrid beamforming operations.

In any of the above, the feedback information for determining the RF precoder matrix may be a first set of indices indicating the selection of one or more selected columns that has been made by the hybrid RF receiver terminal from the first set of DFT columns.

In any of the above, the feedback information for forming the baseband precoder matrix may be a second set of indices indicating a selection of columns, made by the hybrid BF receiver terminal, from a second set of DFT columns. The baseband precoder matrix may be formed using the one or more columns selected by the hybrid BF receiver terminal from the second set of DFT columns, in accordance with the second set of indices.

In any of the above, the feedback information for determining the baseband precoder matrix may be the baseband precoder matrix.

In some aspects, the present disclosure describes a method at a receiver terminal for implementing multi-user multiple-input single-output (MU MISO) communications with a hybrid BF transmitter terminal. The method includes determining a set of one or more candidate radio frequency (RF) precoder vectors for enabling implementation of a hybrid precoder at the hybrid BF transmitter terminal. The method also includes transmitting feedback information about the determined set of candidate RF precoder vectors to the hybrid BF transmitter terminal, the feedback information including information to enable the hybrid BF transmitter terminal to identify candidate columns, selected by the receiver terminal from a set of DFT columns, to form a RF precoder matrix for the hybrid precoder.

In any of the above, the set of candidate RF precoder vectors is determined by selecting one or more candidate RF precoder vectors, from a set of discrete Fourier transform (DFT) columns, along which a channel vector has a maximum projection.

In any of the above, the method may require determining an effective channel vector, using pilot signals received from the hybrid BF transmitter terminal after the RF precoder matrix has been applied at the hybrid BF transmitter terminal, and include transmitting further feedback information, including the determined effective channel vector, to the hybrid BF transmitter terminal.

In any of the above, the method may also require determining the channel vector.

In some aspects, the present disclosure describes a method at a hybrid BF transmitter terminal for implementing multi-user multiple-input single-output (MU MISO) communications with a plurality of receiver terminals. The method includes: receiving, from the plurality of receiver terminals, respective feedback information indicating respective sets of one or more candidate RF precoder vectors to enable the hybrid BF transmitter terminal to form a RF precoder matrix for implementing a hybrid precoder; forming the RF precoder matrix using the sets of one or more candidate RF precoder vectors in accordance with the feedback information; receiving, from the plurality of receiver terminals, respective further feedback information for forming an effective channel matrix; determining, using the effective channel matrix, a baseband precoder matrix for implementing the hybrid precoder; and implementing the hybrid precoder using the RF precoder matrix at an analog RF precoder and the baseband precoder matrix at a digital baseband precoder, to perform hybrid beamforming operations.

In any of the above, forming the RF precoder matrix may include: identifying the sets of one or more candidate RF precoder vectors from a set of discrete Fourier transform (DFT) columns, using the feedback information; and selecting, from the sets of one or more candidate RF precoder vectors, one or more preferred vectors to form the RF precoder matrix.

In any of the above, the respective feedback information for forming each respective set of one or more candidate RF precoder vectors may be a respective set of indices indicating one or more candidate columns selected by a respective receiver terminal from the set of DFT columns.

In any of the above, determining baseband precoder matrix may include performing zero-forcing of the effective channel matrix based on the feedback from the plurality of receivers.

In any of the above, the method may also include: implementing the RF precoder matrix at the analog RF precoder to perform analog beamforming; and transmitting downlink pilot signals to the plurality of receiver terminals using analog beamforming. The further feedback information may be received in response to transmitting the downlink pilot signals. The further feedback information may include a respective effective channel vector from each respective receiver terminal, and the effective channel matrix may be formed using the effective channel vectors.

BRIEF DESCRIPTION OF THE DRAWINGS

Reference will now be made, by way of example, to the accompanying drawings which show example embodiments of the present application, and in which:

FIG. 5 shows pseudo code illustrating an example method for determining hybrid BF precoder matrices for SU MIMO, when there is a limited feedback channel;

FIG. 6 shows pseudo code illustrating an example method for determining hybrid BF precoder matrices for SU MIMO, when there is partial channel knowledge at the hybrid BF transmitter;

FIG. 8 shows pseudo code illustrating an example method for determining a hybrid BF RF precoder vector for MU MISO, at a single-antenna receiver;

Similar reference numerals may have been used in different figures to denote similar components.

DESCRIPTION OF EXAMPLE EMBODIMENTS

Demand for bandwidth in wireless communications is currently growing at a fast rate. With expected future developments in bandwidth-hungry applications such as real-time augmented reality and Internet of things (IoT), it has become important to provide technology that can achieve high data rate wireless links and large bandwidth. Millimeter-wave (mmWave) technology has been of interest for addressing this need. The term mmWave is often used to refer to frequencies in which the wavelength is between about 10 mm to about 1 mm (about 30 GHz to about 300 GHz). Slightly lower frequencies, such as 28 GHz, may also be considered to be part of the mmWave band even though the wavelengths may be longer than 10 mm.

However, mmWave communications present some limitations. One limitation is significant radio signal power propagation loss (when compared to lower frequency communications) due to path loss, combined with atmospheric absorption when wireless systems operate at a high carrier frequency band (e.g., the 60 GHz band). Another limitation is significant inter-symbol interference (ISI) (when compared to lower frequency communications) due to ultra-wide bandwidth communication. Complex receiver equalization has been studied to help reduce or eliminate the ISI.

Massive multiple input multiple output (MIMO) technology has the potential to overcome at least some of the limitations of mmWave systems. The short wavelengths of mmWave communications facilitate the use of an antenna-array with a large number of small-sized antennas (also referred to as radiating elements or radiators), which can be easily embedded into both ends (i.e., both transmitter terminal and receiver terminal) of a communication link. The use of massive MIMO technology in mmWave systems may provide various advantages. For example, the large number of antennas at each terminal may provide high antenna gain (using beamforming), to help improve the received signal to noise power ratio (SNR) and compensate for the expected power loss. As well, the large number of antennas may be used to form a relatively narrow beam for directional communication, which may help to decrease the delay spread of the channel, thus reducing the ISI. Generally, the use of massive MIMO for mmWave communications may be expected to improve overall spectral efficiency and system capacity.

However, the implementation of massive MIMO typically incurs significant operational cost due to the need to use a large number of antenna radio frequency (RF) chains as well as the need for large amount of operational resources for performing channel feedback and beamforming (BF) training. Hybrid analog and digital beamforming (also referred to as simply hybrid BF) technologies have been developed as a way to decrease the number of RF chains attached to an antenna array while keeping the same number of antennas per array.

Figure 1:
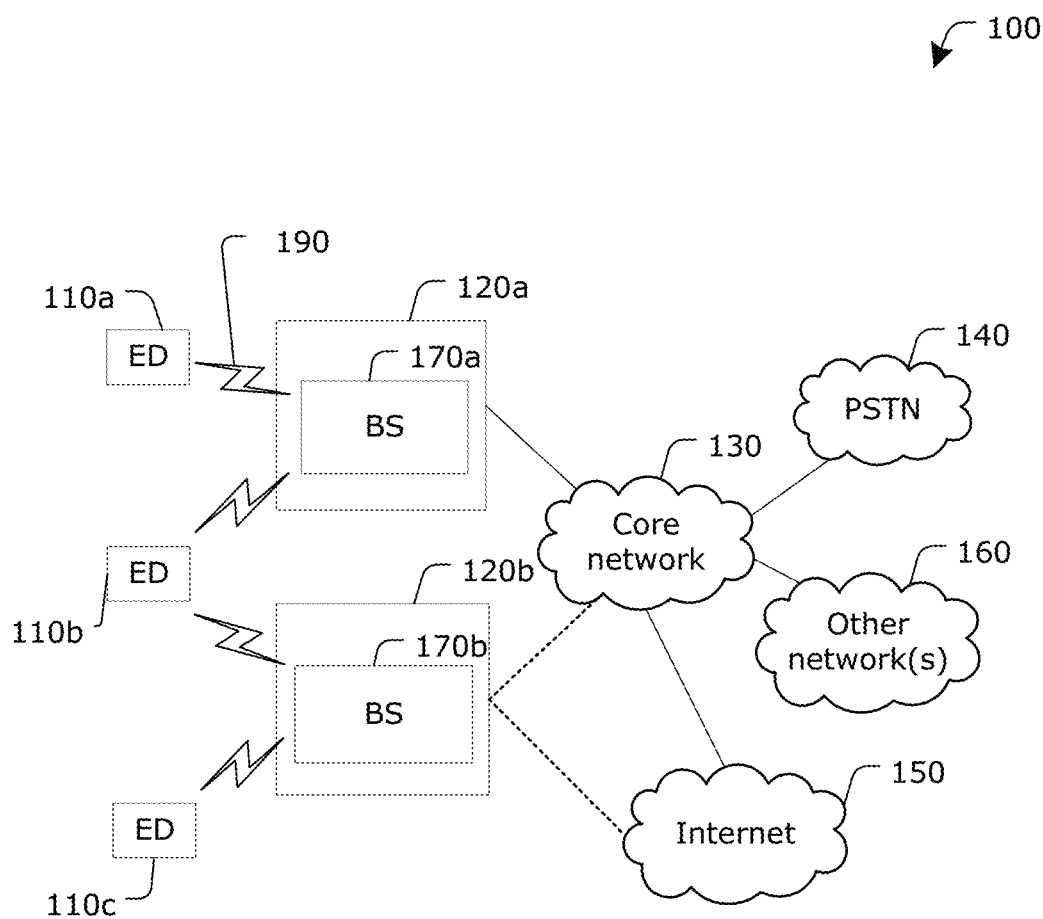
FIG. 1 is a schematic diagram illustrating an example wireless communications system.

To help in understanding the present disclosure, a wireless system is first discussed. FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated (e.g., via broadcast, narrowcast, user device to user device, etc.) among entities of the system 100. The wireless system 100 may operate by sharing resources such as bandwidth.

In this example, the wireless system 100 includes electronic devices (ED) 110a-110c (generically referred to as ED 110), radio access networks (RANs) 120a-120b (generically referred to as RAN 120), a core network 130, a public switched telephone network (PSTN) 140, the internet 150, and other networks 160. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 are configured to transmit, receive, or both via wireless or wired communication channels. Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, or a consumer electronics device, among other possibilities.

In FIG. 1, the RANs 120 include base stations (BSs) 170a-170b (generically referred to as BS 170), respectively. Each BS 170 is configured to wirelessly interface with one or more of the EDs 110 to enable access to any other BS 170, the core network 130, the PSTN 140, the internet 150, and/or the other networks 160. For example, the BS 170s may include (or be) one or more of several well-known devices, such as a base transceiver station (BTS), a radio base station, a Node-B (NodeB), an evolved NodeB (eNodeB), a Home eNodeB, a gNodeB (sometimes called a gigabit Node B), a transmission point (TP), a transmit and receive point (TRP), a site controller, an access point (AP), or a wireless router, among other possibilities. Any ED 110 may be alternatively or additionally configured to interface, access, or communicate with any other BS 170, the internet 150, the core network 130, the PSTN 140, the other networks 160, or any combination of the preceding. The wireless system 100 may include RANs, such as RAN 120b, wherein the corresponding BS 170b accesses the core network 130 via the internet 150, as shown.

The EDs 110 and BSs 170 are examples of communication equipment that can be configured to implement some or all of the functionality and/or embodiments described herein. For example, a BS 170 may serve as a transmitter terminal and one or more EDs 110 associated with the BS 170 may serve as a receiving terminal, for implementation of hybrid BF as discussed further below. In the embodiment shown in FIG. 1, the BS 170a forms part of the RAN 120a, which may include other BSs, base station controller(s) (BSC), radio network controller(s) (RNC), relay nodes, elements, and/or devices. Any BS 170 may be a single element, as shown, or multiple elements, distributed in the corresponding RAN, or otherwise. Also, the BS 170b forms part of the RAN 120b, which may include other BSs, elements, and/or devices. Each BS 170 transmits and/or receives wireless signals within a particular geographic region or area, sometimes referred to as a cell or coverage area. A cell may be further divided into cell sectors, and a BS 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using MIMO or massive MIMO technology. The number of RANs 120 shown is exemplary only. Any number of RANs may be contemplated when devising the wireless system 100.

The BSs 170 communicate with one or more of the EDs 110 over one or more air interfaces 190 using wireless communication links (e.g. radio frequency (RF), microwave, infrared (IR), etc.). The air interfaces 190 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A BS 170 may implement Universal Mobile Telecommunication System (UMTS) Terrestrial Radio Access (UTRA) to establish an air interface 190 using wideband CDMA (WCDMA). In doing so, the BS 170 may implement protocols such as high speed packet access (HSPA), HSPA+ optionally including high speed downlink packet access (HSDPA), high speed uplink packet access (HSUPA) or both. Alternatively, BS 170 may establish an air interface 190 with Evolved UTMS Terrestrial Radio Access (E-UTRA) using LTE, LTE-A, and/or LTE-B. It is contemplated that the wireless system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120 or EDs 110 or both, and (ii) other networks (such as the PSTN 140, the internet 150, and the other networks 160). In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110 may be multimode devices capable of operation according to multiple radio access technologies, and incorporate multiple transceivers necessary to support such.

Figure 2:
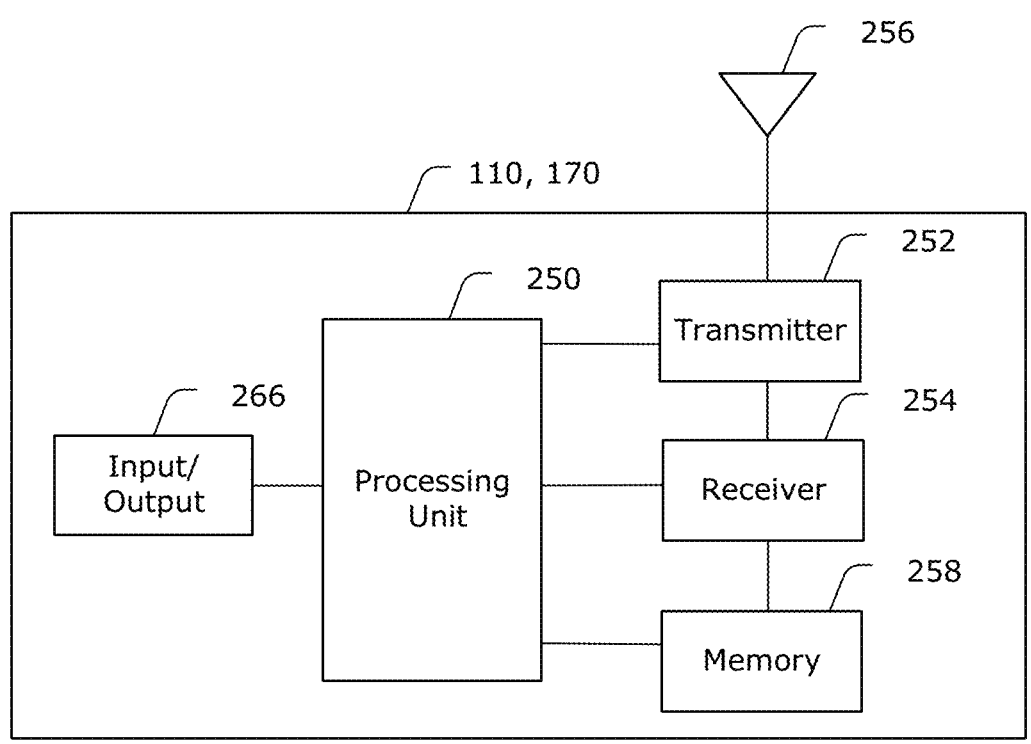
FIG. 2 is a schematic diagram illustrating an example apparatus that may serve as a hybrid BF transmitter terminal and/or a hybrid BF receiver terminal.

FIG. 2 illustrates an example apparatus that may implement the methods and teachings according to this disclosure. In particular, FIG. 2 illustrates a transmitting and receiving apparatus that may be used to implement an example ED 110 or an example BS 170. The apparatus illustrated in FIG. 2 could be used in the wireless system 100 or in any other suitable system.

As shown in FIG. 2, the ED 110 or BS 170 includes at least one processing unit 250, at least one transmitter 252, at least one receiver 254, one or more antenna arrays 256, at least one memory 258, and one or more input/output devices or interfaces 266. The processing unit 250 implements various processing operations, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna array 256 includes any suitable structure for transmitting and/or receiving wireless or wired signals. Although a common antenna array 256 is shown here as being coupled to both the transmitter 252 and the receiver 254, one or more antenna arrays 256 could be coupled to the transmitter(s) 252, and one or more separate antenna arrays 256 could be coupled to the receiver(s) 254.

Each memory 258 stores instructions and data used, generated, or collected by the ED 110 or BS 170. For example, the memory 258 could store software instructions or modules configured to implement some or all of the functionality and/or embodiments described herein and that are executed by the processing unit(s) 250. Each memory 258 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

The input/output device/interface 266 may permit interaction with a user or other device in the network. For example, the input/output device/interface 266 may include any suitable structure for providing information to or receiving/providing information from a user (e.g., a speaker, microphone, keypad, keyboard, display, or touchscreen, among other possibilities), and/or for implementing network interface communications.

Figure 3:
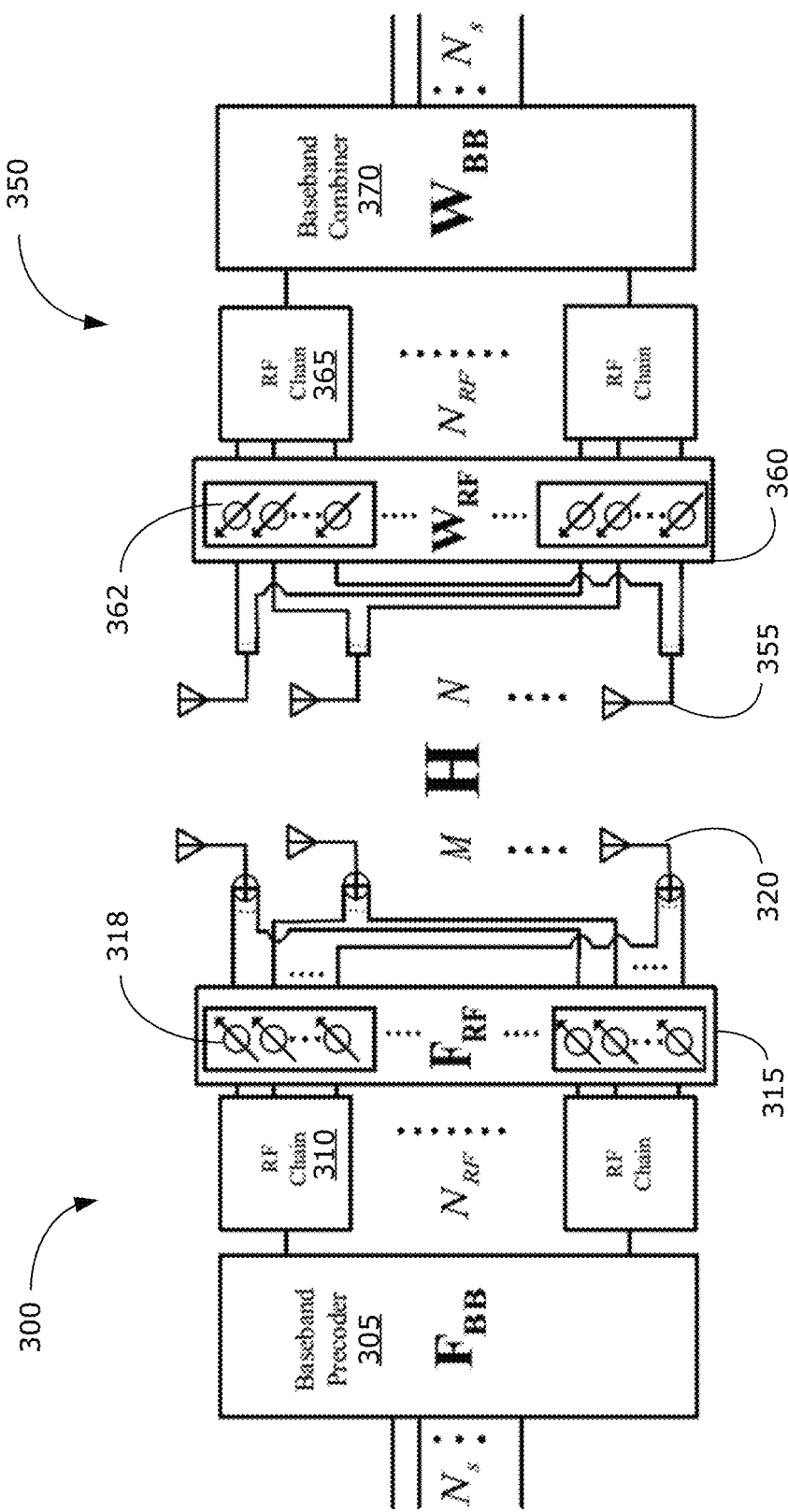
FIG. 3 is a schematic diagram illustrating an example system model of single user MIMO (SU MIMO) using hybrid BF.

FIG. 3 shows a schematic diagram for a system model of SU MIMO using hybrid BF. FIG. 3 illustrates details of a hybrid BF transmitter 300 and hybrid BF receiver 350 (e.g., implemented at the BS 170 and the ED 110, respectively, in the case of a downlink transmission) for implementing hybrid BF. In this example, the transmitter 300 and receiver 350 support MIMO communications, for example using the mmWave band.

The transmitter 300 includes a baseband precoder 305 that performs digital precoding in the baseband domain, using the baseband (or digital) precoder matrix $F_{BB}$. Generally, a precoder matrix may also be referred to as a precoding matrix, beamforming matrix or codeword (e.g., when the precoder matrix is selected from a codebook as discussed further below). In some instances, a precoder matrix may also be simply referred to as a precoder. The baseband precoder 305 processes $N_s$ input data streams to generate $N_{RF}$ outputs, for $N_{RF}$ RF chains 310. Each RF chain 310 includes RF components, such as power amplifiers, digital to analog converters, and mixers, among other possibilities. Each RF chain 310 serves to convert the output of the baseband precoder 305 to RF, to be fed to an analog precoder 315 (also referred to as an analog beamformer). The analog precoder 315 may be implemented using phase shifters 318 to perform beamforming in the RF domain, using the RF (or analog) precoder matrix $F_{RF}$. The output of the analog precoder 315 is provided to M transmit antennas 320 (which form a transmit antenna array) for transmission. The transmitted signal is transmitted over a channel (e.g., a mmWave channel), which is represented in FIG. 3 by a channel matrix H. The signal is received by N receive antennas 355 (which form a receive antenna array) of the receiver 350. The receiver 350 includes an analog combiner 360, which may be implemented using phase shifters 362. The analog combiner 360 implements a RF (or analog) combiner matrix $W_{RF}$ that combines the RF signals from the receive antennas 355 to generate $N_{RF}$ outputs, for $N_{RF}$ RF chains 365. Each RF chain 365 includes RF components, such as low noise amplifiers, analog to digital converters, and mixers, among other possibilities. Each RF chain 365 serves to downconvert the output of the analog combiner 360 to baseband, to be fed to a baseband combiner 370. The baseband combiner 370 implements a baseband (or digital) combiner matrix $W_{BB}$ to recover $N_s$ recovered data streams, for further processing (e.g., decoding).

Digital precoding by the baseband precoder 305 together with beamforming by the analog precoder 315 are jointly considered to maximize the capacity of the overall system, or minimize the average error probability of the system with a reduced number of RF chains 310. Further details of implementation will be discussed further below.

Some background on the design of the precoders at the hybrid BF transmitter is now discussed. Generally, a target for the design of a transceiver in a single-user (SU) MIMO mmWave system is to maximize the spectral efficiency of the system. El Ayach, et al. (Spatially sparse precoding in millimeter wave MIMO systems, *IEEE Transactions on Wireless Communications*, vol. 13, no. 3, pp. 1499-1513, March 2014) describes use of a hybrid BF architecture to approximate the optimal unconstrained fully digital precoder (represented by the optimal precoder matrix $F_{opt}$) given by the dominant right singular vectors of the channel matrix, with the hybrid beamforming structure, $F_{RF}F_{BB}$, and showed that the Euclidean distance between the optimal precoder and the product of the two-stage precoding matrices (i.e., $\|F_{opt}-F_{RF}F_{BB}\|_F^2$, the square Frobenius norm) is an efficient metric in decreasing the mutual information loss due to approximating the optimal precoder matrix with two-stage beamforming matrices.

Currently, there is no analytical solution to the global optima of the optimization problem of finding the beamforming matrices that minimize the capacity loss under typical hardware constraints (e.g., non-convex constraints) of mmWave systems. An Orthogonal Matching Pursuit (OMP) algorithm has been developed to obtain near-optimal hybrid precoders by use of transmit and receive augmented antenna array response matrices as dictionaries to construct the analog precoder and combiner. However, these dictionaries are channel dependent codebooks which change with each channel realization. Therefore, these dictionaries cannot be used as codebooks for limited feedback systems.

The limited (i.e., finite precision) feedback approach is mainly a codebook-based approach. In this approach, the hybrid BF transmitter(s) and hybrid BF receiver(s) agree on a commonly fixed codebook of precoding matrices or beamformers (i.e., codewords) designed according to certain criteria. The hybrid BF receiver, based on a certain metric (which is typically a function of the channel), selects the preferred codeword and sends the codeword index back to the hybrid BF transmitter(s). Consequently, the design of an efficient limited feedback system may be reduced to the design of codebooks that match the selection criteria in order to provide the minimum average distortion measured by certain metrics.

In an approach described by Alkhateeb et. al. (Channel estimation and hybrid precoding for millimeter wave cellular systems, *IEEE Journal of Selected Topics in Signal Processing*, vol. 8, no. 5, pp. 831-846, 2014), the optimal precoder with hybrid precoders is considered by approximating and finding the hybrid precoders algorithmically using OMP, but based on fixed codebooks generated by quantizing the transmit antenna array response uniformly over the angle of departure. The used codebook is known as a beamsteering codebook.

In another approach described by Song et. al. (Codebook design for hybrid beamforming in millimeter wave systems, 2015 *IEEE International Conference on Communications (ICC)*, pp. 1298-1303, 2015), codebooks are specially designed using OMP based on minimizing mean square error (MSE) between the optimal precoder and the hybrid beamformers. The OMP is used to find the analog precoder and the baseband precoder. The analysis is limited to single stream transmission.

In another approach described by Adhikary et. al. (Joint spatial division and multiplexing the large-scale array regime, *IEEE Transactions on Information Theory*, vol. 59, no. 10, pp. 6441-6463, 2013) it is pointed out that the transmit antenna array response matrix becomes a part of the discrete Fourier transform (DFT) matrix as the number of antenna elements goes to infinity and the number of channel paths are limited. In this approach, only a coarse parametric knowledge (the angle of arrival (AoA) interval) for each device is required, rather than an accurate estimate of its channel covariance matrix.

In various examples discussed herein, a design for hybrid BF is disclosed, that may reduce the transmission of feedback information, compared to at least some existing approaches. Generally, it may be desirable for a practical massive MIMO mmWave system to achieve transmission rates as close as possible to theoretical optimal rates, and to also have lower overhead (including overhead due to the transmission of feedback information related to precoders).

In a hybrid BF system, the optimal precoder $F_{opt}$ is approximated by the product of the analog precoder $F_{RF}$ and the digital precoder $F_{BB}$. The approach described by El Ayach et. al. is to minimize $\|F_{opt}-F_{RF}F_{BB}\|_F^2$. In this approach, full information on $F_{opt}$ is needed to be fed back to the hybrid BF transmitter. However, there is no analytical solution to the global optima of this optimization problem.

In examples discussed herein, a limited feedback hybrid BF approach is described. Optimized parameters, which are the indices of the columns of DFT codebooks, may be found using simple greedy algorithms that aim to minimize the chordal distance between the optimal precoder and the hybrid beamformer. This limited feedback may be more efficiently sent back to the hybrid BF transmitter.

In some examples, a low-complexity selection algorithm, referred to as maximum projection, is used to select the columns of $F_{RF}$ and $F_{BB}$ from a DFT-codebook such that these columns have maximum projections on the subspace spanned by the optimal unconstrained (fully digital) precoder $F_{opt}$. The hybrid beamforming process in the hybrid BF transmitter side requires predefined DFT-codebooks and few channel dependent bits carrying the indices of the hybrid precoders. For simplicity, the discussion herein is limited to the design of the hybrid beamformer at the hybrid BF transmitter. The hybrid combiner at the hybrid BF receiver (i.e., for implementing matrices $W_{RF}$ and $W_{BB}$) may be designed using any suitable method, such as the procedure described by El Ayach et. al., for example.

Reference is made to FIG. 3. As discussed above, the transmitter 300 is equipped with M transmit antennas 320 in the transmit antenna array, and the receiver 350 is equipped with N receive antennas 355 in the receive antenna array. The transmitter 300 sends $N_s$ independent data streams to the receiver 350 using $N_{rf}$ RF chains 310. It may be assumed that the number of RF chains 310 at the transmitter 300 and the number of RF chains 365 at the receiver 350 are equal and bounded by:

$$N_s \leq N_{rf} \leq \min(M,N,r) \tag{1}$$

where r is the rank of the channel matrix H. In the example shown, due to the hardware constraints of large scale MIMO systems and the nature of the mmWave channel, hybrid precoding and combining at both the transmitter 300 and the receiver 350, respectively, are considered. In this example, it may be assumed that the input to the transmitter 300 is a data vector s having a size of $N_s \times 1$. The input data stream is processed by two stages: the baseband precoder 305 (implementing the baseband precoder matrix $F_{BB}$) and the RF precoder 315 (implementing the RF precoder matrix $F_{RF}$). The received signal at the receiver 350 may be represented by:

$$r = \sqrt{\rho} H F_{RF} F_{BB} s + n \qquad (2)$$

where s is the $N_s \times 1$ data vector with its power normalized to $$E[ss^H] = \frac{1}{N_s} I_{N_s}, F_{BB}$$

is the baseband precoder matrix having size $N_{rf} \times N_s$, $F_{RF}$ is the RF precoder matrix having size $M \times N_{rf}$, H is the $N \times M$ channel matrix with a power constraint of $E[\|H\|_F] = NM$, $\rho$ is the average SNR, and n is the additive white Gaussian noise vector, statistically distributed by independent and identically distributed variable $CN(0, \sigma^{-2})$. The total transmitted power is normalized such that $\|F_{RF} F_{BB}\|_F^2 = N_s$.

Similarly, the receiver 350 processes the received vector r by two stages: the analog (or RF) combiner 360 (implementing the RF combiner matrix $W_{RF}$) and the baseband combiner 370 (implementing the baseband combiner matrix $W_{BB}$). The processed received signal vector may be represented as:

$$y = \sqrt{\rho} W_{BB}^H W_{RF}^H H F_{RF} F_{BB} s + W_{BB}^H W_{RF}^H n \qquad (3)$$

where $W_{RF}$ is the $N \times N_{rf}$ RF combiner matrix and $W_{BB}$ is the $N_{rf} \times N_s$ baseband combiner matrix. Superscript H indicates the conjugate transpose operation. It should be noted that both the analog precoder 315 and the analog combiner 360 may be realized by using only analog phase shifters without amplitude amplifiers. Therefore, the entries in the respective matrices $F_{RF}$ and $W_{RF}$ have a constant unit norm.

As a result, the spectral efficiency, assuming Gaussian signaling over a mmWave channel with hybrid beamforming and uniform power allocation of the transmitted symbols, may be represented by the following equation as described by El Ayach et al.:

$$R = \log_2 \left( \left| I_{N_s} + \frac{\rho}{N_s} R_n^{-1} W_{BB}^H W_{RF}^H H F_{RF} F_{BB} \times F_{BB}^H F_{RF}^H H^H W_{RF} W_{BB} \right| \right) \qquad (4)$$

where $R_n = \sigma^2 W_{BB}^H W_{RF}^H W_{RF} W_{BB}$ is the noise covariance matrix after the two-stage hybrid combining.

Figure 4:
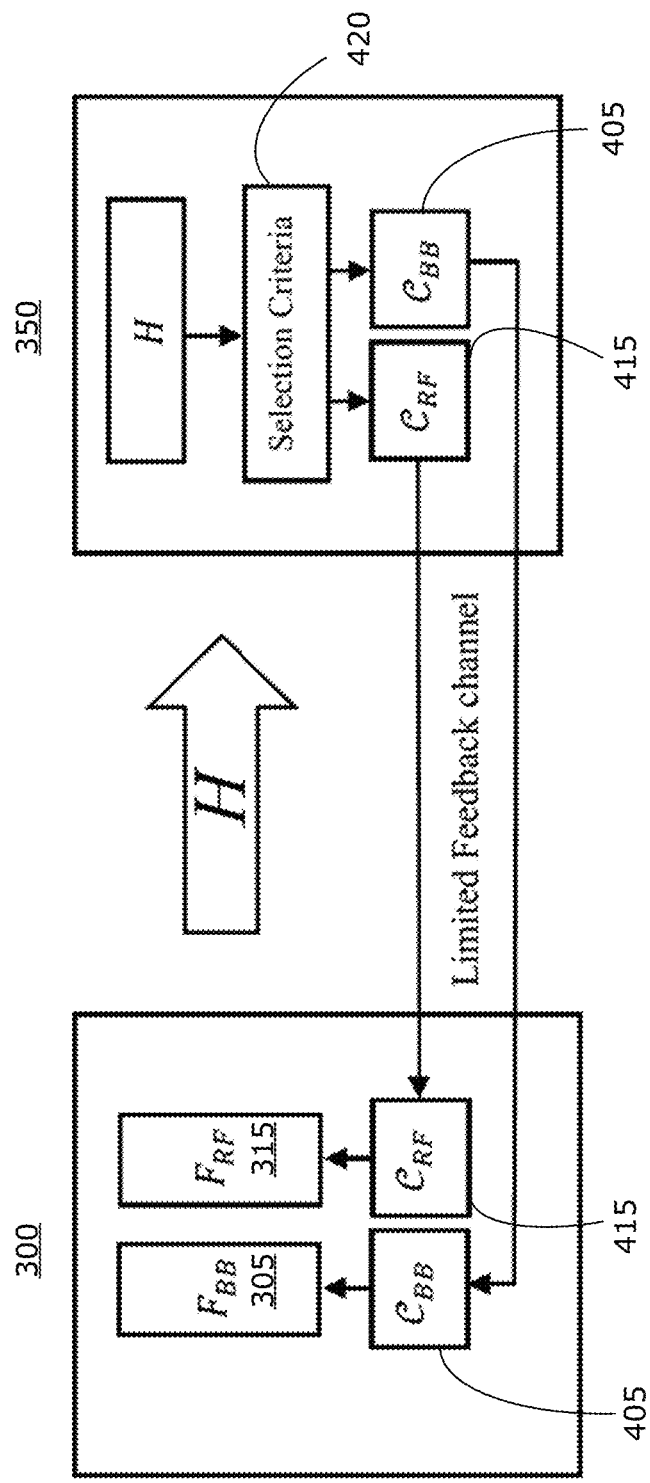
FIG. 4 is a block diagram illustrating an example implementation of a hybrid BF transmitter and hybrid BF receiver for SU MIMO, using a limited feedback channel.

Reference is now made to FIG. 4, which illustrates an example of hybrid BF, using limited feedback. FIG. 4 illustrates how the hybrid BF transmitter 300 and receiver 350 of FIG. 3 may be implemented with the use of codebooks.

It may be assumed that the receiver 350 has perfect and instantaneous channel knowledge (e.g., using any suitable channel-sounding techniques). On the other hand, it may be assumed that the transmitter 300 has limited feedback knowledge about the channel, for example via feedback from the receiver 350 that is communicated through a limited capacity and zero delay feedback channel. In the example shown, the transmitter 300 and the receiver 350 each agree on two predefined codebooks, specifically a baseband (or digital stage) codebook $C_{BB}$ 405 and an RF (or analog stage) codebook $C_{RF}$ 415. For example, the codebooks 405, 415 may have been predefined using a standard or agreed upon between the transmitter 300 and the receiver 350 at initial association. The codebooks 405, 415 store a plurality of predesigned precoder matrices (for the digital precoder and the analog precoder, respectively), each of which correspond to a respective index in the codebook. The codebooks 405, 415 may be stored in respective memories coupled to the transmitter 300 and the receiver 350. For example, in the context of FIG. 2, the memory 258 may store the codebooks 405, 415 at the BS 170 and similarly at the ED 110.

In operation, the receiver 350 selects a baseband precoder matrix $F_{BB}$ from the baseband codebook $C_{BB}$ 405, to be implemented by the digital precoder 305 at the transmitter 300, and the receiver 350 also selects a RF precoder matrix $F_{RF}$ from the RF codebook $C_{RF}$ 415, to be implemented by the analog precoder 315 at the transmitter 300. The selection of the precoder matrices $F_{BB}$, $F_{RF}$ by the receiver 350 is typically performed according to the current channel knowledge (and possibly other criteria), in order to achieve the desired (e.g., optimized) precoder performance at the transmitter 300. As illustrated in FIG. 4, the receiver 350 may apply one or more predefined selection criteria 420. The selection criteria 420 may be stored in a memory coupled to the receiver 350. The selected precoder matrices $F_{BB}$, $F_{RF}$ may be identified using the corresponding indices. In some examples, the receiver 350 may include a processing unit (not shown) to process the channel information (represented by the channel matrix H) and select the precoder matrices $F_{BB}$, $F_{RF}$ from the codebooks 405, 415 according to the selection criteria 420. In other example, a general processing unit of the hybrid BF receiver terminal (e.g., the ED 110) may be used instead of a dedicated processing unit at the receiver 350 of the hybrid BF receiver terminal.

The receiver 350 may inform the hybrid BF transmitter of the selected precoder matrices, for example by sending the indices of both selected precoder matrices to the transmitter 300 through the limited feedback channel. It may be assumed that the number of data streams $N_s$ and the number of RF chains $N_{rf}$ are fixed during the entire communication time between the transmitter 300 and the receiver 350. Such an assumption is typical and may be considered acceptable for most practical communication systems, such as long term evolution (LTE) system because it has a rank indicator (RI) as a scheduled channel state information report.

One consideration is how to model the channel using the channel matrix H. One accepted approach is to use a clustered channel model. This model mathematically captures the main two characteristics of the mmWave channel, specifically the sparse scattering due to high path loss and the spatial correlation due to the large number of antenna array elements. Using this model, the channel matrix may be represented as:

$$H = \sqrt{\frac{MN}{N_{cl}}} \sum_{i,l} \alpha_{il} a_r(\theta_{il}^r) a_t^H(\theta_{il}^t) \qquad (5)$$

where $\alpha_{il}$ is the complex gain of the $l^{th}$ ray in the $i^{th}$ cluster, $a_t(\theta_{il}^t)$ is the transmit antenna array response vector of length M for a given elevation angle of departure denoted by $\theta_{il}^t$, and $\alpha_r(\theta_{il}^r)$ is the receive antenna array response vector of length N for a given elevation angle of arrival denoted by $\theta_{il}^r$. Consider M-element and N-element uniform linear arrays (ULA) for both the hybrid BF transmitter and receiver, respectively. The transmit and receive antenna array responses of ULA with half wave length element spacing are described by El Ayach et. al. as follows:

$$a_t(\theta_{il}^t) = \frac{1}{\sqrt{M}}\left[1, e^{j\pi \sin(\theta_{il}^t)}, \ldots, e^{j(M-1)\pi \sin(\theta_{il}^t)}\right]^T \quad (6)$$

$$a_r(\theta_{il}^r) = \frac{1}{\sqrt{N}}\left[1, e^{j\pi \sin(\theta_{il}^r)}, \ldots, e^{j(N-1)\pi \sin(\theta_{il}^r)}\right]^T \quad (7)$$

The channel matrix H can also be represented in a matrix form as follows:

$$H = A_r G A_t^H \quad (8)$$

where $A_t$ is the augmented matrix of the transmit antenna array response of all paths and has size of M×L, $A_r$ is the augmented matrix of the receive antenna array response of all paths and has a size of N×L, and G is a diagonal matrix that contains the complex channel gains of all paths and has a size of L×L.

One important consideration is the selection criterion that is used by the receiver to select the desired precoder matrices from the predefined codebooks. In various existing approaches for limited feedback precoding/beamforming over a Rayleigh fading channel, different selection criteria have been considered for selecting a precoder matrix from a finite set of precoders (as predefined in a codebook). Four existing selection criteria are now discussed.

One existing selection criterion is to select the precoder matrices that maximize the minimum Euclidean distance of the multidimensional constellation points for a given channel realization (e.g., as represented by the channel matrix H). This criterion is based on the error probability of the maximum likelihood (ML) receiver. It may be undesirable to use this criterion due to the non-linearity in scaling dimensions inherited from the ML receiver and its dependency on the constellation. Another existing selection criterion is to select the precoder matrices that maximize the minimum singular value of the effective channel. This criterion directly minimizes the average error probability of the system when assuming a linear receiver (a zero forcing or minimum mean square error (MMSE) detector) at the receiver side. A third existing selection criterion is to select the precoder matrices that minimize the average MSE between the transmitted symbol and the estimated one. A fourth existing selection criterion is to select the precoder matrices that maximize the mutual information when assuming an uncorrelated complex Gaussian source given the channel realization. It should be noted that maximizing the mutual information or minimizing the MSE does not necessarily decrease the average probability of error.

In the four existing selection criteria discussed above, a common factor is that the optimal unconstrained fully digital precoder matrix $F_{opt}$ is given by the matrix containing the $N_s$ right singular vectors $\bar{V}_{N_s}$ corresponding to the largest $N_s$ singular values of the channel matrix realization, where $H = U\Sigma V^H$ is the singular value decomposition (SVD) of the channel matrix (e.g., as described by Love et al., An overview of limited feedback in wireless communication systems, *IEEE Journal on Selected Areas in Communications*, vol. 26, no. 8, pp. 1341-1365, 2008). The optimal precoder matrix $F_{opt} = \bar{V}_{N_s}$ belongs to the set of unitary matrices $F_{opt} \in U(M, N_s)$.

Another consideration in designing efficient limited feedback communication systems is how to optimally design codebooks that match the aforementioned selection criteria and provide the minimum average distortion measured by the corresponding metrics.

It has been shown that the Grassmannian codebooks provide optimal performance (in the sense of minimizing the average distortion measure), however they are not practical for usage in mmWave systems due to hardware constraints, difficulty in finding good solutions for arbitrary M and $N_s$, and exhaustive search over non-structured codebooks.

In the context of millimeter-wave systems, El Ayach et al. has proved that the loss in the mutual information due to approximating the optimal precoder $F_{opt} = \bar{V}_{N_s}$ with hybrid precoders $F_{RF}F_{BB}$ is determined by the squared chordal distance between the optimal precoder and the hybrid precoder which may be represented as:

$$\|F_{opt}F_{opt}^H - F_{RF}F_{BB} \times F_{BB}^H F_{RF}^H\|_F^2 \quad (9)$$

In examples disclosed herein, the chordal distance is used as a selection criterion for selection of hybrid precoder matrices by the hybrid BF receiver. In particular, the selection aims to select hybrid precoder matrices that achieves a minimum chordal distance from the optimal precoder.

For the analog (or RF) stage, the examples described herein consider a RF codebook $C_{RF}$ that is drawn from the set of DFT-based codebooks $D(M, N_{rf})$ (i.e., $C_{RF} \subseteq D(M, N_{rf})$). The set of DFT-based codebooks $D(M, N_{rf})$ is the group of M×$N_{rf}$ matrices with orthonormal columns drawn from a DFT matrix of size M×M. The M×M DFT matrix $D_M$ whose columns serve as bases for the DFT codebook is given by:

$$D_M = \frac{1}{\sqrt{M}}\begin{bmatrix} 1 & 1 & 1 & \ldots & 1 \\ 1 & \omega & \omega^2 & \ldots & \omega^{(M-1)} \\ 1 & \omega^2 & \omega^4 & \ldots & \omega^{2(M-1)} \\ \vdots & \vdots & \vdots & \ddots & \vdots \\ 1 & \omega^{(M-1)} & \omega^{2(M-1)} & \ldots & \omega^{(M-1)(M-1)} \end{bmatrix} \quad (10)$$

where $$\omega = e^{-j\frac{2\pi}{M}}.$$

Considering all the combinations of the columns of the DFT matrix above, an RF codebook $C_{RF} \subseteq D(M, N_{rf})$, which has $$\binom{M}{N_{rf}}$$

matrices of size M×$N_{rf}$. Each matrix in $D(M, N_{rf})$ represents an $N_{rf}$-dimensional subspace of $\mathbb{C}^{M \times N_{rf}}$.

It should be noted that the DFT-based codebook has certain practical properties that naturally fit the mmWave systems. All the matrices have constant-magnitude variable-phase entries, which enables the implementation of the RF (analog) beamforming by phase shifters, thus satisfying the hardware constraint. The orthogonality between the DFT matrix columns helps to provide savings in the computational complexity of the selection algorithm. The symmetrical structure of the DFT matrix provides a reduction in the storage requirement for the codebook. The columns of the DFT matrix can be considered as good approximates to the transmit array vectors (described in equation (6) above) for M different effective directions of departure.

For the baseband (digital) beamforming stage, unlike the RF precoder matrix $F_{RF}$, the baseband precoder matrix $F_{BB}$ has no hardware constraints. That is, $F_{BB} \in \mathbb{C}^{N_{rf} \times N_s}$ can be implemented digitally, so all its entries have variable magnitude and phase. This may allow for many choices for the baseband codebook $C_{BB}$. For example, the baseband codebook may include an optimal yet less practical choice such as Grassmannian codebooks, a practical DFT-based codebook, or a very practical QPSK alphabet-based codebook (e.g., as used in 3GPP LTE systems).

The selection criterion, in various examples disclosed herein, is based on a chordal distance measurement. Specifically, the selection criterion is a minimization problem, where the chordal distance from the unconstrained optimal precoder is considered to be minimized. The chordal distance is given by the $N_s$ right singular vectors of the channel matrix $F_{opt} = V_{N_s}$ and the hybrid beamforming matrices $F_{RF} F_{BB}$ such that these matrices are selected from $C_{RF}$ and $C_{BB}$, respectively. The limited feedback problem for a MIMO mmWave channel with hybrid beamforming structure can be formalized as:

$$F_{RF}, F_{BB} \overset{\text{argmin}}{} \|F_{opt} F_{opt}^H - F_{RF} F_{BB} \times F_{BB}^H F_{RF}^H\|_F^2 \quad (11)$$

subject to: constraint A: $F_{RF} \in C_{RF}$, $C_{RF} \subseteq D(M, N_{rf})$; and constraint B: $F_{BB} \in C_{BB}$, $C_{BB} \subseteq D(N_{rf}, N_s)$.

Constraint A is applied to guarantee that the RF precoder matrix $F_{RF}$ adheres to the hardware constraint of the mmWave system; and constraint B is to seek practical implementation of the baseband precoder matrix $F_{BB}$. Because the two codebooks have matrices with orthonormal columns, there is no need to impose a power normalizations constraint. This problem can be summarized as follows: select the RF precoder matrix $F_{RF}$ from the RF codebook $C_{RF}$ and the baseband precoder matrix $F_{BB}$ from the baseband codebook $C_{BB}$ such that the product $F_{RF} F_{BB}$ has the smallest chordal distance to the optimal precoder matrix $F_{opt}$. Conventionally, the typical way to solve this optimization problem is by exhaustive search. The complexity of exhaustive search may be manageable in conventional communication systems because one needs to select only one matrix from only one codebook and this matrix has small dimensions, typically ≤8×16. However, in mmWave systems, one needs to approximate the optimal precoder with the product of two different matrices where each matrix is selected out of a respective different codebook, which is made more challenging by the high dimensions of mmWave systems, typically around 64×256. Therefore, the exhaustive search is impractical in mmWave systems.

The present disclosure describes a solution to the optimization problem without relying on the conventional exhaustive search. FIG. 5 shows pseudocode illustrating an example disclosed approach for determining hybrid BF precoder matrices, when there is a limited feedback channel. In this example, the optimization problem defined in equation (11) is solved in two stages. First, the RF precoder matrix $F_{RF}$ is determined by solving equation (11) without considering constraint B. This first stage is illustrated by lines 1-4 of the pseudocode in FIG. 5. Second, given $F_{RF}$, the baseband precoder matrix $F_{BB}$ is determined by solving equation (11) again but without considering constraint A. This second stage is illustrated by lines 5-8 of the pseudocode in FIG. 5. In line 3 of the pseudocode, the notation $$\text{Indices}_{RF} = \underset{N_{rf}}{\text{argmax}} \{\text{diag}(YY^H)\}$$

is used to indicate that the RF indices are selected as the indices of the largest $N_{rf}$ diagonal elements in matrix $YY^H$. Similarly, in line 6 of the pseudocode, the notation $$\text{Indices}_{BB} = \underset{N_s}{\text{argmax}} \{\text{diag}(ZZ^H)\}$$

is used to indicate that the baseband indices are selected as the indices of the largest $N_s$ diagonal elements in matrix $ZZ^H$.

The method illustrated by the pseudocode in FIG. 5 uses a maximum projection approach. The input is the optimal precoder matrix $F_{opt}$, the M×M DFT matrix $D_M$ (which provides the bases of the RF codebook $C_{RF}$) and the $N_{rf} \times N_{rf}$ DFT matrix $D_{N_{rf}}$ (which provides the bases of the baseband codebook $C_{BB}$). The projection of $F_{opt}$ onto $D_M$ is performed (calculated as the dot product of the columns of the optimal precoder matrix $F_{opt}$ and the columns of the M×M DFT matrix $D_M$). In this example, the projection is stored in a temporary matrix Y. From Y, a selection is made of the $N_{rf}$ vectors along which the optimal precoder matrix $F_{opt}$ has the maximum projection. In some examples, it may not be necessary to store the projection in a temporary matrix, and the selection may be made directly from the calculated projection. Storing the projection in a temporary matrix may help to reduce computational time. In this example, the selected vectors are identified by the indices of the corresponding columns of $D_M$ (indicated as $\text{Indices}_{RF}$ in FIG. 5). The selected vectors together form the RF precoder matrix $F_{RF}$. Having determined the RF precoder matrix $F_{RF}$, the second stage is to find the baseband precoder matrix $F_{BB}$. In this example, this involves finding the $N_s$ linear combinations of the selected vectors along which the optimal precoder $F_{opt}$ has the maximum projection. This may be performed by projecting the $N_{rf} \times N_{rf}$ DFT matrix $D_{N_{rf}}$ (which provides the bases of the baseband codebook $C_{BB}$) on the column space of $F_{RF}$ to obtain $N_{rf}$ linear combinations. These linear combinations are stored in another temporary matrix Z. From Z, a selection is made of the $N_s$ vectors along which the optimal precoder $F_{opt}$ has the maximum projection again. Similarly to the temporary matrix Y, in some examples the linear combinations are not stored in a temporary matrix. In this example, the selected $N_s$ vectors are identified by the indices of the corresponding columns of $D_{N_{rf}}$ (indicated as $\text{Indices}_{BB}$ in FIG. 5). The selected vectors together form the baseband precoder matrix $F_{BB}$.

As illustrated by the pseudocode in FIG. 5, the output may be simply the indices $\text{Indices}_{RF}$ and $\text{Indices}_{BB}$ that indicate which columns in the matrices $D_M$ and $D_{N_{rf}}$ should be used to form the respective RF precoder matrix $F_{RF}$ and baseband precoder matrix $F_{BB}$. After the hybrid BF receiver performs this method to determine the precoder matrices $F_{RF}$ and $F_{BB}$, the hybrid BF receiver may communicate the indices $\text{Indices}_{RF}$ and $\text{Indices}_{BB}$ to the hybrid BF transmitter, to enable the hybrid BF transmitter to form the precoder matrices $F_{RF}$ and $F_{BB}$ using the indicated columns. It may be noted that, because the precoder matrices $F_{RF}$ and $F_{BB}$ are formed by selecting columns from a codebook, both the precoder matrices $F_{RF}$ and $F_{BB}$ may be considered to be quantized (i.e., limited to values from a codebook, rather than being any complex number).

The principle of this method is to select precoder matrices $F_{RF}$ and $F_{BB}$ such that the $N_s$ columns of the hybrid precoder $F_{RF}F_{BB}$ have the smallest angles with the columns of the optimal precoder $F_{opt}$. This method may be based on the chordal distance definition given by:

$$d_{ch}(\bar{V}_{N_s}, F_{RF}F_{BB}) = \|\bar{V}_{N_s}\bar{V}_{N_s}^H - F_{RF}F_{BB} \times (F_{RF}F_{BB})^H\|_F = (\Sigma_{i=1}^{N_s} \sin^2 \varnothing_i)^{1/2} \quad (12)$$

where $$\phi_i \in \left[0, \frac{\pi}{2}\right]$$

is the ith principal angle between $\bar{V}_{N_s}$ and $F_{RF}F_{BB}$, which is defined as $\varnothing_i = \cos^{-1}(\sigma_i)$ where $\sigma_i$ is the ith singular value of $(F_{RF}F_{BB})^H \bar{V}_{N_s}$ (see Ye, et al. Schubert varieties and distances between subspaces of different dimensions, *SIAM Journal on Matrix Analysis and Applications*, vol. 37, no. 3, pp. 1176-1197). It should be understood that maximizing the dot product of two columns is equivalent to minimizing the angle between the two columns. The definition of the angle between two vectors p and q is $$\phi = \cos^{-1}\left(\frac{p^H q}{\|p\|\|q\|}\right).$$

In this instance, the columns of the DFT matrix are unitary vectors, as are the columns of the right singular matrix $\bar{V}_{N_s}$; and the cosine function is a monotonically decreasing function when $$\phi_i = \left[0, \frac{\pi}{2}\right];$$

accordingly, maximizing the dot product between the columns of the hybrid precoder and the columns of the optimal precoder is equivalent to minimizing the angle between them.

In some examples, it may be assumed that the hybrid BF transmitter has partial channel knowledge. The partial channel knowledge assumption assumes that the hybrid BF receiver sends the baseband precoder matrix to the hybrid BF transmitter with high resolution precision (e.g., a large number of bits, such as about 24 bits), but the RF precoder matrix is available with lower resolution precision (e.g., only a few bits). In the present disclosure high resolution precision may refer to instances where the resolution is high enough to be effectively considered close to infinite precision. For example, the sampling rate of the digital to analog converter may be sufficiently high to provide the desired high resolution precision. This assumption can be considered as a practical one in cases where the communication channel is quasi-static and for a relatively small number of data streams $N_s$. In such cases, a low-complexity selection algorithm, called maximum projection least squares (MP-LS), is considered. Using MP-LS, the columns of $F_{RE}$ are selected from a DFT matrix (whose columns serve as bases for the DFT codebook), and $F_{BB}$ is solved for as the least squares solution such that the selected columns of $F_{RE}$ have maximum projections on the subspace spanned by the optimal precoder matrix $F_{opt}$.

FIG. 6 shows pseudocode illustrating an example disclosed approach for determining hybrid BF precoder matrices, using the partial channel knowledge assumption. Compared to the approach illustrated by the pseudocode of FIG. 5, in the approach of FIG. 6 the hybrid beamforming process at the hybrid BF transmitter requires instantaneous and perfect knowledge of the baseband precoder matrix in addition to the predefined DFT matrix providing the bases and requires few channel dependent bits carrying the indices of the RF precoder matrix.

It should be noted that lines 1-4 in FIG. 6 are similar to lines 1-4 of FIG. 5, which performs maximum projection. That is, the approach illustrated in FIG. 6 involves determining the RF precoder matrix $F_{RF}$ by finding the $N_{rf}$ columns of the M×M DFT matrix $D_M$ along which the optimal precoder $F_{opt}$ has the maximum projection. The example approach illustrated in FIG. 6 solves for the baseband precoder matrix $F_{BB}$ as the least square solution based on the quantized RF precoder matrix $F_{RF}$. That is, the baseband precoder matrix $F_{BB}$ may have entries with variable magnitude and phase, rather than being limited to numbers from a codebook. This may improve the performance of the hybrid beamformer at the cost of increasing the overhead in transmitting feedback from the hybrid BF receiver to the hybrid BF transmitter. Such a tradeoff may be acceptable in situations where the channel is semi-static or slow varying, such that feedback is required less often.

As discussed above, the method illustrated by the pseudocode in FIG. 6 uses a MP-LS approach. The input is the optimal precoder matrix $F_{opt}$, and the M×M DFT matrix $D_M$. The projection of $F_{opt}$ onto $D_M$ is performed (calculated as the dot product of the columns of the optimal precoder matrix $F_{opt}$ and the columns of the M×M DFT matrix $D_M$). In this example, the projection is stored in a temporary matrix Y. From Y, a selection is made of the $N_{rf}$ vectors along which the optimal precoder matrix $F_{opt}$ has the maximum projection. In some examples, it may not be necessary to store the projection in a temporary matrix, and the selection may be made directly from the calculated projection. Storing the projection in a temporary matrix may help to reduce computational time. In this example, the selected vectors are identified by the indices of the corresponding columns of $D_M$ (indicated as Indices RF in FIG. 6). The selected vectors together form the RF precoder matrix $F_{RF}$. Having determined the RF precoder matrix $F_{RF}$, the second step is to find the baseband precoder matrix $F_{BB}$. In the example illustrated in FIG. 6, unlike the example of FIG. 5, the baseband precoder matrix $F_{BB}$ is calculated directly from the RF precoder matrix $F_{RF}$, by calculating the projection of which the optimal precoder matrix $F_{opt}$ onto the determined the RF precoder matrix $F_{RF}$.

As illustrated by the pseudocode in FIG. 6, the output is the indices $Indices_{RF}$ (which is used to determine the RF precoder matrix $F_{RF}$ from the M×M DFT matrix $D_M$) and the full baseband precoder matrix $F_{BB}$. After the hybrid BF receiver performs this method to determine the precoder matrices $F_{RF}$ and $F_{BB}$, the hybrid BF receiver may communicate the index $Indices_{RF}$ to the hybrid BF transmitter, to enable the hybrid BF transmitter to form the RF precoder matrix $F_{RF}$ using the indicated columns. The hybrid BF receiver further communicates the full baseband precoder matrix $F_{BB}$ to the hybrid BF transmitter.

It should be noted that a hybrid BF receiver and transmitter may be capable of both the approach illustrated in FIG. 5 as well as the approach illustrated in FIG. 6 for performing SU MIMO. For example, the hybrid BF receiver and transmitter may use the approach illustrated in FIG. 5 in situations where limited feedback is appropriate (e.g., for a fast-changing channel that requires quicker feedback information) and may use the approach illustrated in FIG. 6 where the hybrid BF transmitter may have partial channel knowledge (e.g., for a semi-static or slow-changing channel where less frequent feedback is sufficient). In some examples, the approach illustrated in FIG. 5 may be used even where the channel is slow-changing, for example to reduce the feedback overhead.

Regardless of whether the approach illustrated in FIG. 5 or FIG. 6 is used, the methods disclosed above may help to significantly reduce the required feedback for hybrid BF in SU MIMO, by using DFT matrices $D_M$ and $D_{N_{rf}}$ as bases for codebooks. As discussed above, the feedback from the receiver may be simply the indices of the columns of the DFT matrix (rather than requiring a full codebook or a full matrix). Moreover, the computational complexity of the disclosed methods may be less than the computational complexity of at least some previously-discussed existing approaches. For instance, compared to existing compressive sensing techniques, the projection of the optimal precoder matrix $F_{opt}$ on an orthogonal codebook (e.g., the M×M DFT matrix $D_M$) as disclosed herein may require only one iteration, whereas the projection of the optimal precoder matrix $F_{opt}$ on a highly correlated codebook (e.g., the transmit antenna array response) as required in compressive sensing techniques requires at least $N_{rf}$ iterations.

Moreover, projecting the optimal precoder matrix $F_{opt}$ on symmetrically-structured codebooks such as the M×M DFT matrix $D_M$ has a computational complexity of $O(N_s N \log(N))$, whereas projecting $F_{opt}$ on the transmit antenna array response matrix has a computational complexity of $O(N_s N^2)$.

The present disclosure also describes an example approach for hybrid BF in multi-user (MU) multiple-input single-output (MISO) communications. In this example, the channel may be a broadcast channel (BC). In the context of MU networks, the availability of channel state information at transmitter (CSIT) may play an important rule. In particular, the CSIT may significantly widen the capacity region and hence the degrees of freedom (DoF) region (related to maximum multiplexing gain) of a given network. Under an assumption of full CSIT, where the hybrid BF transmitter is assumed to have global and instantaneously perfect CSI, a wireless network may have the widest possible DoF region. On the other hand, when the hybrid BF transmitter has a total lack of CSIT, the DoF region of most wireless networks may have the narrowest region. However, global, perfect and instantaneous CSIT is an ideal assumption which typically does not occur in real, practical applications. When hybrid BF is used for MU MISO, more antennas are needed in order to achieve the same performance as a fully digital beamformer, however the use of hybrid BF decreases the required number of RF chains from M to $N_{rf}$.

Figure 7:
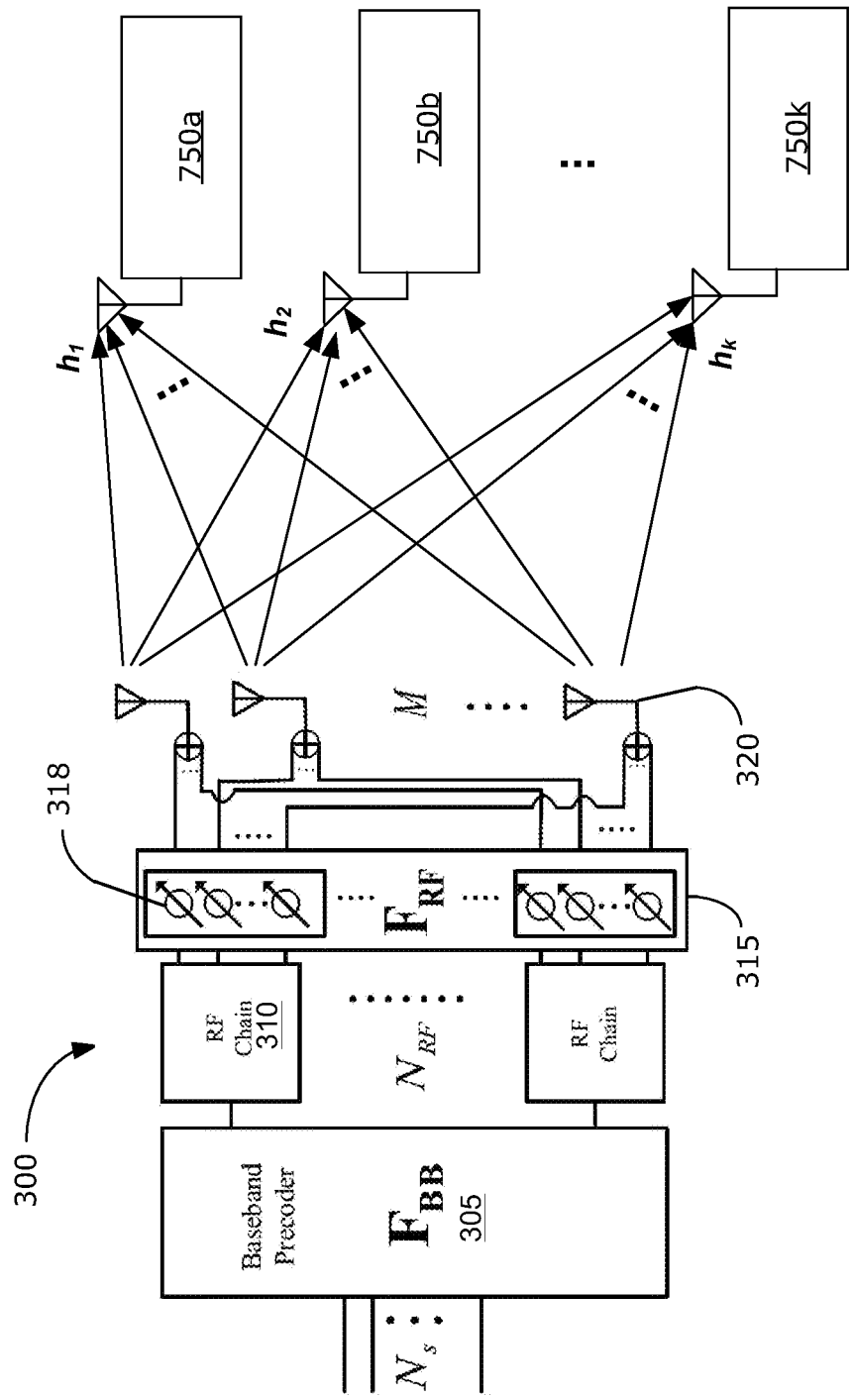
FIG. 7 is a schematic diagram illustrating an example system model of multi-user multiple-input single-output (MU MISO) using hybrid BF.

FIG. 7 shows a schematic diagram for a system model of MU MISO using hybrid BF. In FIG. 7, the transmitter 300 is similar to the transmitter 300 of FIG. 3, therefore the details of the transmitter 300 will not be repeated here. FIG. 7 shows K single-antenna receivers 750a-750k (generally referred to as receivers 750). For example, the transmitter 300 may be implemented at the BS 170 and each receiver 750 may be a respective single-antenna ED 110, in the case of a downlink broadcast transmission).

The transmitter 300 communicates with the receivers 750 over a BC. The transmitter 300 is equipped with an M-element ULA. In this example, the transmitter 300 serves K single-antenna receivers 750 and hence the transmitter 300 has $N_{rf}$ RF chains 310 with M>>$H_{rf}$≥K. The augmented received signals vector for all receivers 750 may be represented as:

$$y = HF_{RF}F_{BB}x + z \qquad (13)$$

where H is a K×M channel matrix that contains K channel vectors, and $H^H = [h_1^H, h_2^H, \ldots, h_K^H]$ where $h_k^H$ is the channel vector of length M×1 for the k-th receiver 750k. $h_k^H$ may be represented as:

$$h_k^H = \sqrt{\frac{MK}{N_{cl}N_{ray}}} \sum_{i,l} \alpha_{il}^k a_t^k(\theta_{il}) \qquad (14)$$

In equation (13), the RF precoder matrix $F_{RF}$ is M×$N_{rf}$ containing phase only entries, the baseband precoder matrix $F_{BB}$ is $N_{rf}$×K, x is a K×1 data vector and z is a K×1 additive white Gaussian noise (AWGN) vector.

It may be assumed that each receiver has perfect channel knowledge of its own channel vector only (i.e., receiver 750k has perfect channel knowledge of only $h_k$). Generally, global channel knowledge at the receiver may not be required. In addition, it may be assumed that the RF precoder matrix $F_{RF}$ is available at the hybrid BF transmitter 300 (e.g., received through a limited feedback channel). The baseband precoder matrix $F_{BB}$ may be calculated at the hybrid BF transmitter 300 by use of high resolution precision feedback of the effective channel $H_{eff} = HF_{RF}$, which is the massive MIMO channel matrix H after applying the RF precoder matrix $F_{RF}$. $H_{eff}$ is a K×$N_{rf}$ matrix that contains K effective channel vectors, such that $H_{eff}^H = [h_{eff}^1, h_{eff}^2, \ldots, h_{eff}^K]$. The effective channel vectors $N_{eff}$ differ from the channel vectors $h_k$ in that $h_k$ is the result of preliminary channel estimation by the receivers (in response to pilot signals from the hybrid BF transmitter without any precoding applied), and $h_{eff}$ is the result of a second round of channel estimation by the receivers after the RF precoder matrix $F_{RF}$ has been applied at the hybrid BF transmitter. Moreover, it may be assumed that the hybrid BF transmitter 300 has no access to the massive MIMO channel matrix H. However, the effective channel $H_{eff}$ is available with high resolution precision to the hybrid BF transmitter 300 through a two-stage process. In particular, after applying the RF precoder matrix $F_{RF}$ at the hybrid BF transmitter 300, the it $i^{th}$ receiver estimates the effective channel vector $h_{eff}^i$ using downlink pilot signals sent by the hybrid BF transmitter. The $i^{th}$ receiver then feeds the estimated $h_{eff}^i$ back with high resolution precision to the transmitter 300.

An example method for hybrid BF for MU MISO, with partial channel knowledge at the hybrid BF transmitter, is now disclosed. As mentioned above, each receiver is equipped with a single antenna and thereby there is no signal combining at the receivers sides. In this example disclosed approach, the precoding strategy involves firstly determining a respective set of one or more candidate RF precoder vectors $f_{RF}^K$ at each receiver.

FIG. 8 shows pseudocode illustrating an example for determining candidate RF precoder vectors at one receiver (in this example, the k-th receiver). The feedback information provided to the transmitter is column indices indicating the candidates selected, as discussed further below. The input is the channel vector $h_k$ that is known to the k-th receiver, and the M×M DFT matrix $D_M$. The receiver selects L candidate DFT vectors from the M×M DFT matrix $D_M$ that maximizes the received SNR. The orthogonality of the columns in the DFT matrix $D_M$ is utilized to separate the recipients and improve the SNR. In the example of FIG. 8, the selection of L candidate DFT vectors involves projecting the channel vector $h_k$ onto the M×M DFT matrix $D_M$. The projection may be stored in temporary matrix Y. From Y, a selection is made of the L candidate vectors along which the channel vector $h_k$ has the maximum projection. In some examples, it may not be necessary to store the projection in a temporary matrix, and the selection may be made directly from the calculated projection. Storing the projection in a temporary matrix may help to reduce computational time. In this example, the selected candidate vectors are identified by the indices of the corresponding columns of $D_M$ (indicated as Indices$_{RF}$ in FIG. 8). The selected vectors together form the set of candidate RF precoder vectors $f_{RF}^k$ for the k-th receiver.

The process illustrated by the pseudocode of FIG. 8 may be performed by each receiver. Each receiver sends a respective set of L selected candidate vectors (e.g., indicated by a respective set of indices Indices$_{RF}^k$) to the hybrid BF transmitter.

Second, after each receiver chooses a respective set of L candidate columns and send the respective set of indices to the hybrid BF transmitter, the hybrid BF transmitter may use this information to construct the RF precoder matrix $F_{RF}$. In the approach disclosed herein, the hybrid BF transmitter constructs the RF precoder matrix $F_{RF}$ by selecting the preferred K vectors out of the total K×L candidate vectors received from all K receivers. Each of the preferred K vectors corresponds to one respective receiver. Selection of the preferred K vectors by the hybrid BF transmitter may be based on feedback information provided by each receiver. For example, each receiver may transmit a set of indices indicating the best L candidate columns in descending order (or ascending order) such that the first (or last) element in the set of indices indicates the column along which the channel vector has the maximum projection. In the case where two or more receivers have selected one or more same candidate DFT columns, the hybrid BF transmitter selects the next best column(s) out of the L candidate vectors (e.g., using the next entry in the set of indices), such that there is no common column. Hence, the hybrid BF transmitter can select K DFT columns corresponding to respective K receivers, to form the RF precoder matrix $F_{RF}$. This may be represented as:

$$F_{RF} = [f_{RF}^1, f_{RF}^2, \ldots, f_{RF}^K]. \quad (15)$$

Having determined the RF precoder matrix $F_{RF}$, the hybrid BF transmitter may then determine the baseband precoder matrix $F_{BB}$ based on the RF precoder matrix $F_{RF}$. For example, each receiver may provide feedback of its estimated effective channel vector $h_{eff}$. This feedback of the estimated effective channel vector may be performed together with feedback of the selected RF precoder vector (e.g., as indicated by indices$_{RF}$), or may be fed back in a separate communication. The baseband precoder matrix $F_{BB}$ may then be determined, by the hybrid BF transmitter, to be the zero-forcing of the effective channels, represented by the equation $H_{eff} = HF_{RF}$, such that $F_{BB} = H_{eff}^H (H_{eff} H_{eff}^H)^{-1}$.

In the example approach illustrated by FIG. 8, instead of requiring full channel state information (CSI) (size M×N matrix) as considered in existing approaches, the column indices of a DFT matrix (size M×M) for forming the RF precoder matrix (for analog beamforming) is fed back from each receiver (e.g., EDs) to the hybrid BF transmitter (e.g., a BS). The hybrid BF transmitter uses the RF precoder matrix to conduct the second stage beamforming training. Each receiver also feeds back a respective estimated effective channel (size 1×N$_{rf}$, with high resolution precision) to the hybrid BF transmitter. The baseband precoder matrix (for digital beamforming) can be calculated at the hybrid BF transmitter based on the feedback of the RF precoder and the estimated effective channel. This two-stage hybrid BF approach may help to reduce the feedback information that needs to be communicated, and may have minor or negligible throughput performance degradation compared to the case using fully-digital beamforming.

The disclosed example methods for performing hybrid BF have been discussed above with respect to example pseudo-codes and equations. For further understanding, the disclosed example methods are discussed below with respect to generalized flowcharts.

Figure 9A:
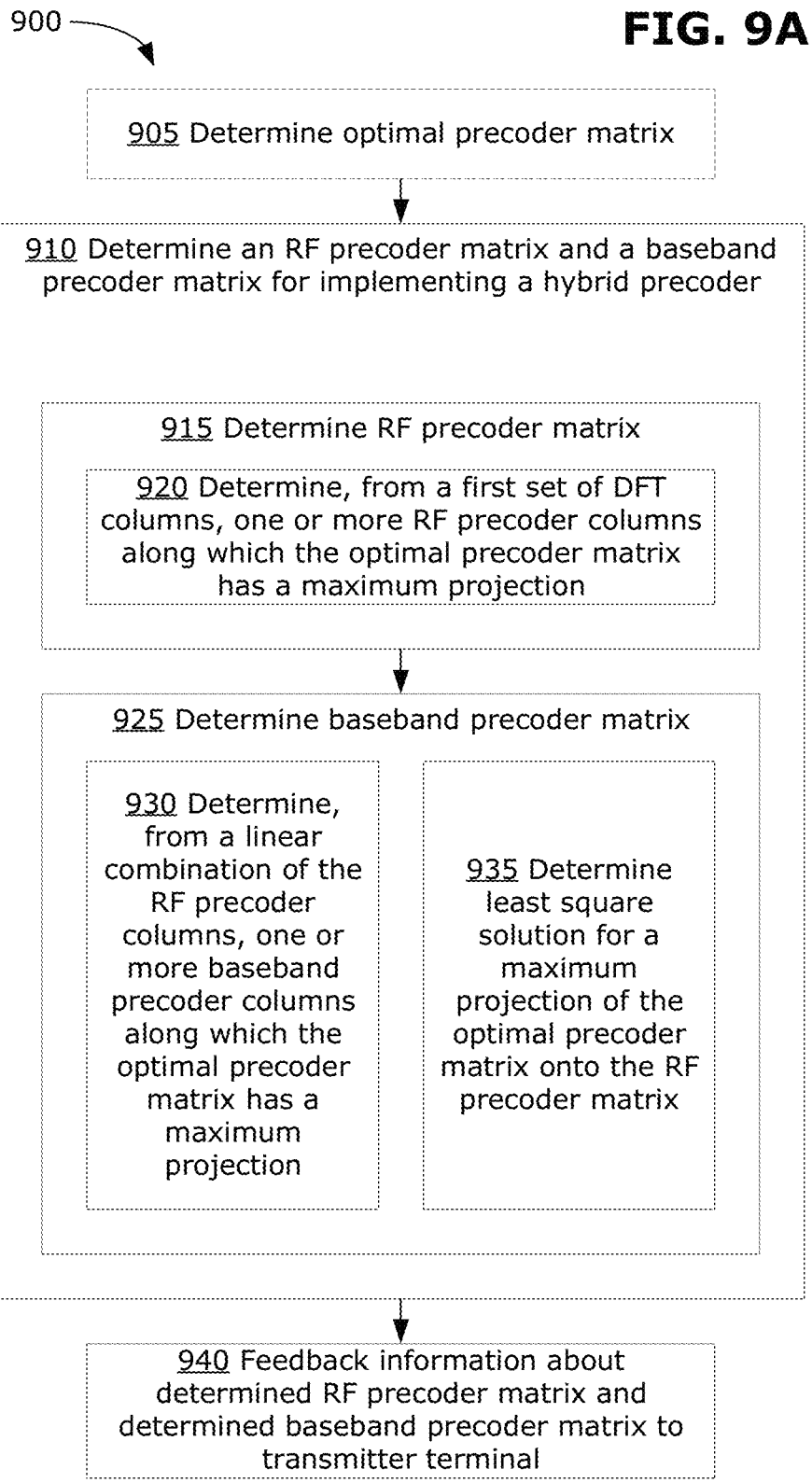
FIGS. 9A and 9B are flowcharts that illustrate example methods at a hybrid BF receiver and a hybrid BF transmitter, respectively, for hybrid BF in SU MIMO.
Figure 9B:
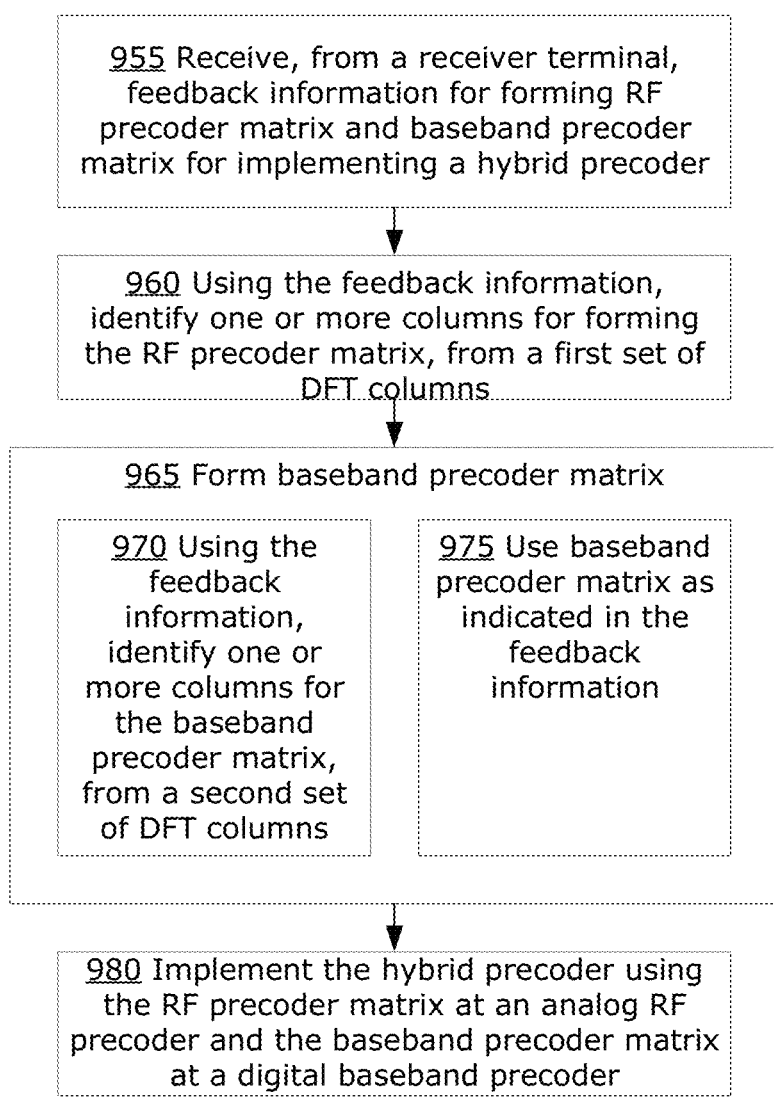

FIGS. 9A and 9B illustrate example methods 900 and 950, which may be used at a receiver and a transmitter, respectively, for hybrid BF in SU MIMO FIG. 9A is described first. The method 900 may be implemented at a hybrid BF receiver terminal (e.g., an ED). For example, the method 900 may be implemented by a general processing unit of the hybrid BF receiver terminal, or may be implemented by a dedicated processing unit at a receiver of the hybrid BF receiver terminal. It should be understood that appropriate instructions for performing the method 900 may be stored in a memory of the hybrid BF receiver terminal, or otherwise accessible and executable by the processing unit.

At 905, optionally, the optimal precoder matrix $F_{opt}$ may be first determined. For example, the optimal precoder matrix $F_{opt}$ may be calculated based on a channel matrix, using any suitable technique. In some examples, the optimal precoder matrix $F_{opt}$ may be predetermined (e.g., calculated in a prior channel estimation procedure and stored) and step 905 may be omitted from the method 900. At 910, the RF precoder matrix $F_{RF}$ and baseband precoder matrix $F_{BB}$ are determined based on a selection criterion. For example, a selection criterion may be minimizing (or as near minimizing as practical) the chordal distance from the optimal precoder. This is mathematically represented by equation (9) above. It should be understood that another selection criterion may be used (e.g., other selection criterion described above with respect to existing hybrid BF approaches). In FIG. 9A, step 910 involves two stages: determining the RF precoder matrix at 915 and determining the baseband precoder matrix at 925.

At 915, the RF precoder matrix is determined. In FIG. 9A, the RF precoder matrix is determined by determining RF precoder columns, by finding the columns in a first set of DFT columns (e.g., in the form of the M×M DFT matrix $D_M$) along which the optimal precoder matrix $F_{opt}$ has a maximum projection. The RF precoder columns may then be selected as those of the first set of DFT columns that result in the highest projections of the optimal precoder matrix $F_{opt}$. The first set of DFT columns may be considered to serve as the bases for the RF codebook $C_{RF}$ from which the RF precoder matrix $F_{RF}$ is selected. Example algorithms for performing step 920 are discussed above with respect to the pseudocode shown in FIGS. 5 and 6.

Having determined the RF precoder matrix, the baseband precoder matrix is determined at 925. Depending on the channel, step 925 may be performed using step 930 or step 935. Step 930 may be performed in limited feedback channel cases. For example, step 930 may be more suitable in cases where the channel is fast-changing or in any cases where reduced feedback overhead is desired. Alternatively, step 935 may be performed in cases where there is partial channel knowledge at the hybrid BF transmitter. For example, step 935 may be more suitable in cases where the channel is slow-changing or any cases where increased feedback overhead is less of a concern.

Step 930 is discussed first. At 930, the baseband precoder matrix $F_{BB}$ is determined by determining baseband precoder columns, by finding the linear combinations of RF precoder columns along which the optimal precoder matrix $F_{opt}$ has a maximum projection. As discussed above with respect to the pseudocode shown in FIG. 5, this maximum projection calculation may involve projecting a second set of DFT columns (e.g., in the form of the $N_{rf} \times N_{rf}$ DFT matrix $D_{N_{rf}}$) onto the RF precoder matrix $F_{RF}$ to obtain the linear combinations, then projecting the optimal precoder matrix $F_{opt}$ onto the linear combinations. The baseband precoder columns may then be selected as those of the second set of DFT columns that result in the highest projections of the optimal precoder matrix $F_{opt}$. The second set of DFT columns may be considered to serve as the bases for the baseband codebook $C_{BB}$ from which the baseband precoder matrix $F_{BB}$ is selected. An example algorithm for performing step 930 is discussed above with respect to the pseudocode shown in FIG. 5.

Alternatively, at 935, the baseband precoder matrix $F_{BB}$ is determined by calculating the least square solution for a maximum projection of the optimal precoder matrix $F_{opt}$ onto the RF precoder matrix $F_{RF}$. An example algorithm for performing step 935 is discussed above with respect to the pseudocode shown in FIG. 6.

At 940, information about the determined RF precoder matrix $F_{RF}$ and the determined baseband precoder matrix $F_{BB}$ are fed back to the hybrid BF transmitter terminal. For example, feedback information about the determined RF precoder matrix $F_{RF}$ may be in the form of a first set of indices corresponding to the RF precoder columns that have been selected from the first set of DFT columns at step 920. Feedback information about the determined baseband precoder matrix $F_{BB}$ may similarly be in the form of a second set of indices corresponding to the baseband precoder columns that have been selected from the second set of DFT columns at step 930. Feedback information about the determined baseband precoder matrix $F_{BB}$ may alternatively be in the form of the baseband precoder matrix $F_{BB}$ calculated at step 935.

Although not shown in FIG. 9A, the hybrid BF receiver terminal may further use the determined RF precoder matrix $F_{RF}$ and determined baseband precoder matrix $F_{BB}$ to determine the corresponding RF combiner matrix $W_{RF}$ and baseband combiner matrix $W_{BB}$, in order to implement the hybrid combiner at the receiver.

FIG. 9B is now discussed. The method 950 may be implemented at a hybrid BF transmitter terminal (e.g., a BS). For example, the method 950 may be implemented by a general processing unit of the hybrid BF transmitter terminal, or may be implemented by a dedicated processing unit at a transmitter of the hybrid BF transmitter terminal. It should be understood that appropriate instructions for performing the method 950 may be stored in a memory of the hybrid BF transmitter terminal, or otherwise accessible and executable by the processing unit.

At 955, the feedback information from the hybrid BF receiver terminal (e.g., transmitted at step 940 described above) is received. The feedback information is used by the hybrid BF transmitter to form the RF precoder matrix $F_{RF}$ and baseband precoder matrix $F_{BB}$ for implementing the hybrid precoder at the hybrid BF transmitter.

At 960, using the feedback information, the hybrid BF transmitter terminal identifies the columns of the RF precoder matrix $F_{RF}$ that have been selected by the hybrid BF receiver terminal from the first set of DFT columns (e.g., in the form of the M×M DFT matrix $D_M$, which serve as the bases for the RF codebook $C_{RF}$). For example, as discussed above, the feedback information about the RF precoder matrix $F_{RF}$ may be in the form of a first set of indices indicating which columns from the first set of DFT columns should be used in order to form the RF precoder matrix $F_{RF}$.

At 965, the baseband precoder matrix $F_{BB}$ is formed. Depending on the type of feedback information provided, step 965 may be performed using step 970 or step 975. Step 970 may be performed when the feedback information about the baseband precoder matrix $F_{BB}$ is in the form of a second set of indices (e.g., in limited feedback channel cases). Alternatively, step 975 may be performed in cases where the feedback information about the baseband precoder matrix $F_{BB}$ is in the form of the full baseband precoder matrix $F_{BB}$ (e.g., when there is partial channel knowledge at the hybrid BF transmitter).

Step 970 is discussed first. At 970, using the feedback information, the hybrid BF transmitter terminal identifies the columns of the baseband precoder matrix $F_{BB}$ that have been selected by the hybrid RF receiver terminal from the second set of DFT columns (e.g., in the form of the $N_{rf} \times N_{rf}$ DFT matrix $D_{N_{rf}}$, which serves as the bases for the baseband codebook $C_{BB}$). For example, as discussed above, the feedback information about the baseband precoder matrix $F_{BB}$ may be in the form of a second set of indices indicating which columns from the second set of DFT columns should be used in order to form the baseband precoder matrix $F_{BB}$.

Alternatively, at 975, the baseband precoder matrix $F_{BB}$ may be simply the baseband precoder matrix $F_{BB}$ that is fully provided in the feedback information.

At 980, having formed both the RF precoder matrix $F_{RF}$ and the baseband precoder matrix $F_{BB}$, the hybrid precoder is implemented at the hybrid BF transmitter in order to perform hybrid BF. The RF precoder matrix $F_{RF}$ is implemented at an analog RF precoder, and the baseband precoder matrix $F_{BB}$ is implemented at a digital baseband precoder.

Following the methods 900 and 950, after the hybrid precoder has been implemented at the transmitter of the hybrid BF transmitter terminal, and after the corresponding hybrid combiner has been implemented at the receiver of the hybrid BF receiver terminal, hybrid BF may take place between the hybrid BF receiver terminal (e.g., an ED) and the hybrid BF transmitter terminal (e.g., a BS) for SU MIMO communications.

Figure 10A:
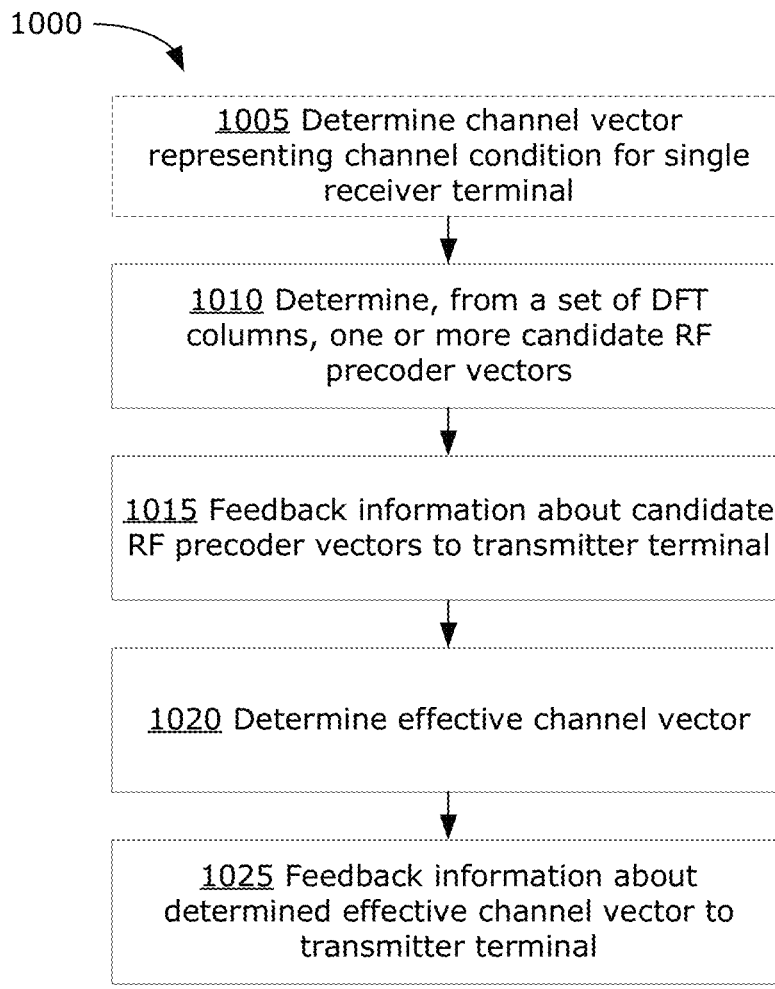
FIGS. 10A and 10B illustrate example methods at a receiver and a hybrid BF transmitter, respectively, for hybrid BF in MU MISO.
Figure 10B:
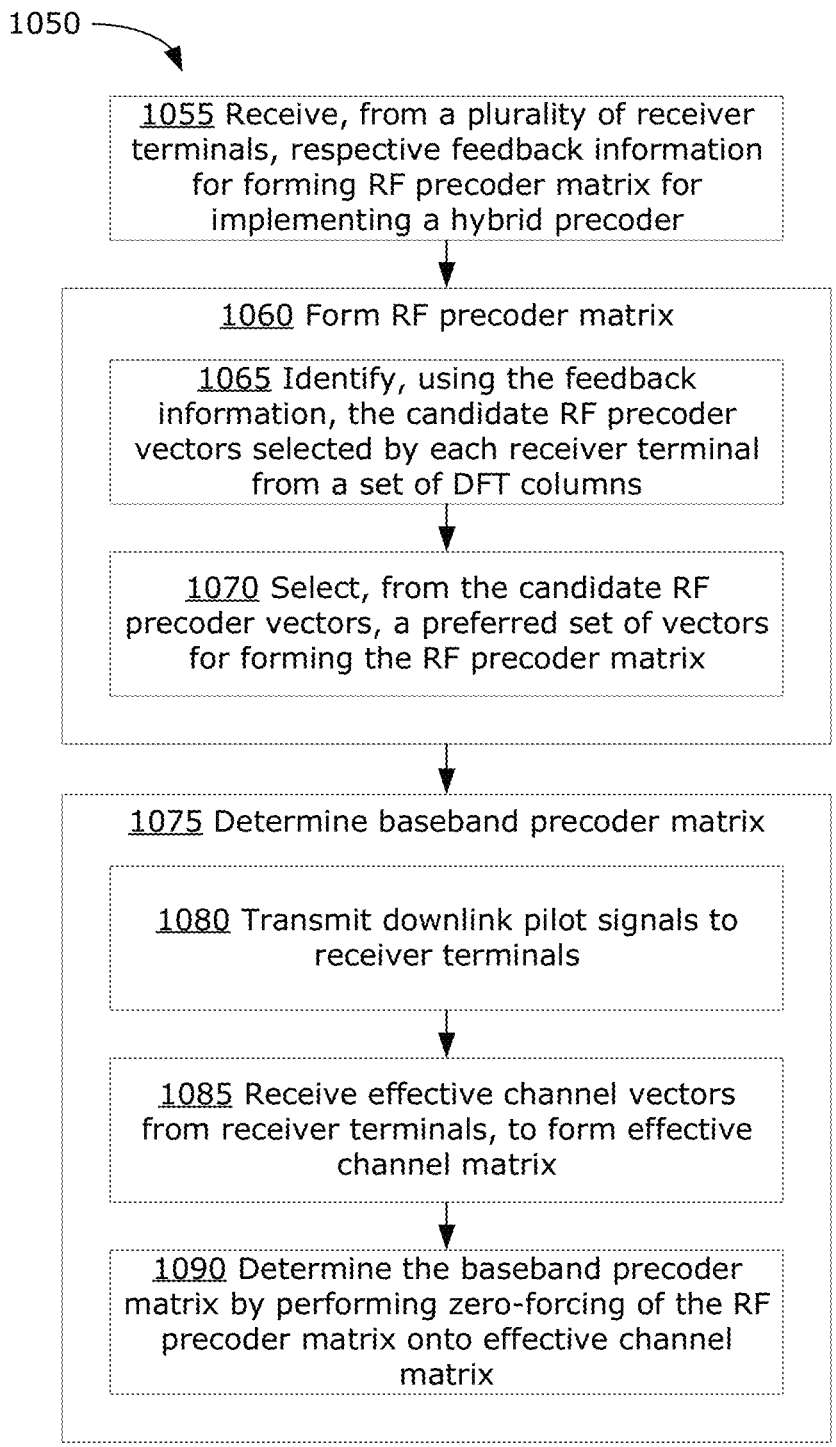

FIGS. 10A and 10B illustrate example methods 1000 and 1050, which may be used at a plurality of receivers and a hybrid BF transmitter, respectively, for hybrid BF in MU MISO.

FIG. 10A is described first. The method 1000 may be implemented at one of a plurality of single-antenna receiver terminals (e.g., an ED). For example, the method 1000 may be implemented by a general processing unit of the receiver terminal, or may be implemented by a dedicated processing unit at a receiver of the receiver terminal. It should be understood that appropriate instructions for performing the method 1000 may be stored in a memory of the receiver terminal, or otherwise accessible and executable by the processing unit. The method 1000 may be performed independently and in parallel by each receiver terminal that is involved in the MU MISO communications. For convenience, the method 1000 is described below with respect to a single receiver terminal, the k-th receiver terminal.

At 1005, optionally, the channel vector $h_k$ may be first determined. For example, the channel vector $h_k$ may be determined using any suitable channel estimation method. In some examples, the channel vector $h_k$ may be predetermined (e.g., calculated in a prior channel estimation procedure and stored) and step 1005 may be omitted from the method 1000.

At 1010, one or more candidate RF precoder vectors $f_{RF}^k$ are determined. Each receiver terminal determines a set of candidate RF precoder vector(s) $f_{RF}^k$ for itself. For example, the candidate RF precoder vector(s) $f_{RF}^k$ for the k-th receiver terminal may be determined by finding the columns in a set of DFT columns (e.g., in the form of the M×M DFT matrix $D_M$) along which the channel vector $h_k$ has a maximum projection. The candidate RF precoder vector(s) $f_{RF}^k$ may then be selected as those of the set of DFT columns that result in the highest projections of the channel vector $h_k$ (this selection approach may enable the receiver terminal to select the candidate precoder vector(s) that maximize its own SNR). In other examples, another selection criterion may be used. The set of DFT columns (e.g., in the form of the M×M DFT matrix $D_M$) may be considered to serve as the bases for the RF codebook $C_{RF}$ from which the RF precoder matrix $F_{RF}$ is selected. An example algorithm for performing step 1010 is discussed above with respect to the pseudocode shown in FIG. 8.

At 1015, information about the determined candidate RF precoder vector(s) $f_{RF}^k$ is fed back to the hybrid BF transmitter terminal. For example, feedback information about the determined candidate RF precoder vector(s) $f_{RF}^k$ may be in the form of a set of indices corresponding to the columns that have been selected from the set of DFT columns at step 1010.

The hybrid BF transmitter terminal, having received information about respective candidate RF precoder vectors $f_{RF}^k$ from the plurality of receiver terminals that are involved in the MU MISO communications, uses this information to implement the analog precoder at the hybrid BF transmitter and send downlink pilot signals.

At 1020, the k-th receiver terminal determines the effective channel vector $h_{eff}^k$, using the downlink pilot signals. For example, the receiver terminal may use any suitable channel estimation techniques to estimate the effective channel vector $h_{eff}^k$. Each receiver terminal determines the effective channel vector $h_{eff}^k$ for itself.

At 1025, the receiver terminal feeds back information about the determined effective channel vector $h_{eff}^k$ to the hybrid BF transmitter terminal. For example, each receiver terminal may feed back this information in a respective assigned slot (e.g., in TDMA).

The hybrid BF transmitter terminal, having received information about respective effective channel vectors $h_{eff}^k$ from the plurality of receiver terminals that are involved in the MU MISO communications, uses this information to implement the baseband precoder at the hybrid BF transmitter terminal.

FIG. 10B is now discussed. The method 1050 may be implemented at a hybrid BF transmitter terminal (e.g., a BS) for MU MISO communications with a plurality of receiver terminals. For example, the method 1050 may be implemented by a general processing unit of the hybrid BF transmitter terminal, or may be implemented by a dedicated processing unit at a transmitter of the hybrid BF transmitter terminal. It should be understood that appropriate instructions for performing the method 1050 may be stored in a memory of the hybrid BF transmitter terminal, or otherwise accessible and executable by the processing unit.

At 1055, the feedback information about a plurality of candidate RF precoder vectors $f_{RF}$ (e.g., transmitted at step 1015 described above) is received from the plurality of receiver terminals. The feedback information is used by the transmitter to form the RF precoder matrix $F_{RF}$ for implementing the hybrid precoder at the hybrid BF transmitter terminal.

At 1060, the RF precoder matrix $F_{RF}$ is formed. Step 1060 involves steps 1065 and 1070.

At 1065, using the feedback information, the hybrid BF transmitter terminal identifies the candidate RF precoder vectors $f_{RF}$ that have been selected, by each respective receiver terminal, from the set of DFT columns (e.g., in the form of the M×M DFT matrix $D_M$, which serves as the bases for the RF codebook $C_{RF}$). For example, as discussed above, the feedback information about the candidate RF precoder vectors $f_{RF}$ may be in the form of respective sets of indices indicating which columns from the set of DFT columns should be used in order to form each respective set of candidate RF precoder vectors $f_{RF}^k$.

At 1070, a preferred set of vectors is selected from all the candidate RF precoder vectors $f_{RF}$, and the RF precoder matrix $F_{RF}$ is formed using the preferred set of vectors. As discussed above, the hybrid BF transmitter terminal may select the preferred K vectors from among all the candidate RF precoder vectors $f_{RF}$. In some examples, where there is overlap among two (or more) sets of candidate RF precoder vectors $f_{RF}$ from two (or more) different receivers, the hybrid BF transmitter terminal may select the preferred set of vectors in order to avoid having the same vector selected for two (or more) different receiver terminals.

Having determined the RF precoder matrix $F_{RF}$, the hybrid BF transmitter terminal proceeds to step 1075 to determine the baseband precoder matrix $F_{BB}$. Step 1075 involves steps 1080, 1085 and 1090.

The hybrid BF transmitter terminal uses the RF precoder matrix $F_{RF}$ to implement the analog precoder in order to perform analog beamforming. At 1080, using analog beamforming, the downlink pilot signals are transmitted to the plurality of receiver terminals.

As described at steps 1020 and 1025 above, the receiver terminals each use the pilot signals to determine a respective effective channel vector $h_{eff}^k$ and feed back information about the effective channel vectors $h_{eff}^k$ to the hybrid BF transmitter terminal.

At 1085 the hybrid BF transmitter terminal receives the plurality of effective channel vectors $h_{eff}$ from the plurality of receiver terminals. The hybrid BF transmitter uses the effective channel vectors $h_{eff}$ to form the effective channel matrix $H_{eff}$.

At 1090, the baseband precoder matrix $F_{BB}$ is determined by performing zero-forcing of the RF precoder matrix $F_{RF}$ onto the effective channel matrix $H_{eff}$.

Having formed both the RF precoder matrix $F_{RF}$ and the baseband precoder matrix $F_{BB}$, the hybrid precoder is implemented at the hybrid BF transmitter terminal in order to perform hybrid BF. The RF precoder matrix $F_{RF}$ is implemented at an analog RF precoder, and the baseband precoder matrix $F_{BB}$ is implemented at a digital baseband precoder.

Following the methods 1000 and 1050, after the hybrid precoder has been implemented at the transmitter of the hybrid BF transmitter terminal, hybrid BF may take place between the plurality of single-antenna receiver terminals (e.g., EDs) and the hybrid BF transmitter terminal (e.g., a BS) for MU MISO communications.

The above discussion has focused on finding the precoder matrices for implementing the RF and baseband precoders at the transmitter. It should be understood that, using the determined hybrid precoder, the corresponding RF and baseband combiners for implementing the hybrid combiner at the receiver may be calculated using any suitable procedure.

In various examples, the present disclosure describes example approaches for hybrid BF that may achieve relatively high spectral efficiency, and at the same time helps to reduce the required channel knowledge feedback, and helps to reduce the computational complexity of the precoders.

The examples described herein may be less computationally complex and may require less channel knowledge compared to existing hybrid BF approaches (e.g., exhaustive search algorithm, OMP). For example, a simple greedy selection algorithm is used instead.

The examples described herein use feedback of indices of DFT matrix columns for analog and/or digital beamforming to help reduce the feedback information. In some examples, the feedback of indices of DFT matrix columns for analog beamforming is used with high resolution precision of feedback for digital beamforming.

The examples described herein may be useful for massive MIMO communications, including use for mmWave communications. For example, the examples described herein may help to reduce implementation cost and help to adhere to hardware constraints of mmWave systems, when using hybrid BF.

The present disclosure includes examples that may be applicable for single user systems as well as examples that may be applicable for multi-user systems when the number of antennas are larger than the number of RF chains. The disclosed examples may be applicable for development of next generation or future Wi-Fi technologies, and may also be applicable for existing wireless technologies such as existing Wi-Fi technologies.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method at a hybrid beamforming (BF) receiver terminal for implementing single user multiple-input multiple-output (SU MIMO) communications with a hybrid BF transmitter terminal, the method comprising:
determining a radio frequency (RF) precoder matrix and a baseband precoder matrix for implementing a hybrid precoder at the hybrid BF transmitter terminal; and
transmitting feedback information about the determined RF precoder matrix and the determined baseband precoder matrix to the hybrid BF transmitter terminal, the feedback information including at least first information indicating first two or more selected columns from a first discrete Fourier transform (DFT) matrix to enable the hybrid BF transmitter terminal to form the RF precoder matrix using the first two or more selected columns;
the feedback information further including at least second information indicating second one or more selected columns from a second DFT matrix to enable the hybrid BF transmitter terminal to form the baseband precoder matrix using the second one or more selected columns;
wherein the RF precoder matrix is determined by selecting, from the first DFT matrix, the first two or more RF precoder columns along which an optimal precoder matrix has a maximum projection on the first DFT matrix.

2. The method of claim 1, wherein the RF precoder matrix is determined such that the hybrid precoder has a minimum or near minimum chordal distance from an optimal precoder matrix.

3. The method of claim 1, wherein the feedback information about the determined RF precoder matrix is a first set of indices indicating the selection from the first DFT matrix.

4. The method of claim 2, further comprising:
determining the optimal precoder matrix.

5. The method of claim 1, wherein the baseband precoder matrix is determined by selecting, from a set of linear combinations of the RF precoder columns, one or more baseband precoder columns along which the optimal precoder matrix has a maximum projection.

6. The method of claim 5, wherein the set of linear combinations of the RF precoder columns is determined by projecting the second DFT matrix onto the RF precoder matrix.

7. A method at a hybrid beamforming (BF) transmitter terminal for implementing single user multiple-input multiple-output (SU MIMO) communications with a hybrid BF receiver terminal, the method comprising:
receiving, from the hybrid BF receiver terminal, feedback information to enable the hybrid BF transmitter terminal to implement a hybrid precoder using a radio frequency (RF) precoder matrix and a baseband precoder matrix;

forming the RF precoder matrix and the baseband precoder matrix using the feedback information, wherein the feedback information indicates first two or more selected columns which have been selected by the hybrid BF receiver terminal from a first discrete Fourier transform (DFT) matrix, and the RF precoder matrix is formed using the first two or more selected columns, and the feedback information further indicates a selection, by the hybrid BF receiver terminal, of second one or more columns from a second DFT matrix to enable the hybrid BF transmitter terminal to select the second one or more columns from the second DFT matrix to form the baseband precoder matrix; and implementing the hybrid precoder using the RF precoder matrix at an analog RF precoder and the baseband precoder matrix at a digital baseband precoder, to perform hybrid beamforming operations.

8. The method of claim 7, wherein the feedback information for determining the RF precoder matrix is a first set of indices indicating the selection of the two or more selected columns that has been made by the hybrid BF receiver terminal from the first of DFT matrix.

9. The method of claim 7, wherein the feedback information for forming the baseband precoder matrix is a second set of indices indicating the selection of the second one or more columns, made by the hybrid BF receiver terminal, from the second DFT matrix.

10. A method at a receiver terminal for implementing multi-user multiple-input single-output (MU MISO) communications with a hybrid beamforming (BF) transmitter terminal, the method comprising:

determining a set of one or more candidate radio frequency (RF) precoder vectors for enabling implementation of a hybrid precoder at the hybrid BF transmitter terminal;

transmitting feedback information about the determined set of candidate RF precoder vectors to the hybrid BF transmitter terminal, the feedback information including information to enable the hybrid BF transmitter terminal to identify candidate columns, selected by the receiver terminal from a discrete Fourier transform (DFT) matrix, to form a RF precoder matrix for the hybrid precoder; and transmitting further feedback information about channel conditions to form a baseband precoder matrix for implementing the hybrid precoder;

wherein the set of candidate RF precoder vectors is determined by selecting one or more candidate RF precoder vectors, from the DFT matrix, along which a known channel vector for the receiver terminal has a maximum projection.

11. The method of claim 10, further comprising:
determining an effective channel vector, using pilot signals received from the hybrid BF transmitter terminal after the RF precoder matrix has been applied at the hybrid BF transmitter terminal; and transmitting further feedback information, including the determined effective channel vector, to the hybrid BF transmitter terminal.

12. The method of claim 10, further comprising:
determining, by the receiver terminal, the known channel vector, using pilot signals received from the hybrid BF transmitter prior to applying any precoding.

13. A method at a hybrid beamforming (BF) transmitter terminal for implementing multi-user multiple-input single-output (MU MISO) communications with a plurality of receiver terminals, the method comprising:

receiving, from the plurality of receiver terminals, respective feedback information indicating respective sets of one or more candidate RF precoder vectors to enable the hybrid BF transmitter terminal to form a RF precoder matrix for implementing a hybrid precoder;

forming the RF precoder matrix by selecting, from the sets of candidate RF precoder vectors indicated in the feedback information, one or more preferred vectors indicated by the feedback information as vectors along which a respective channel vector, known to a respective receiver terminal, has a maximum projection;

wherein the one or more preferred vectors are selected such that there is no repeated vector in the one or more preferred vectors;

receiving, from the plurality of receiver terminals, respective further feedback information indicating channel conditions for forming an effective channel matrix;

determining, using the effective channel matrix, a baseband precoder matrix for implementing the hybrid precoder; and implementing the hybrid precoder using the RF precoder matrix at an analog RF precoder and the baseband precoder matrix at a digital baseband precoder, to perform hybrid beamforming operations.

14. The method of claim 13, wherein forming the RF precoder matrix comprises:

identifying the sets of one or more candidate RF precoder vectors from a of discrete Fourier transform (DFT) matrix, using the feedback information.

15. The method of claim 14, wherein the respective feedback information for forming each respective set of one or more candidate RF precoder vectors is a respective set of indices indicating one or more candidate columns selected by a respective receiver terminal from the of DFT matrix.

16. The method of claim 13, wherein determining baseband precoder matrix comprises:

performing zero-forcing of the RF precoder matrix onto the effective channel matrix.

17. The method of claim 13, further comprising:
implementing the RF precoder matrix at the analog RF precoder to perform analog beamforming; and transmitting downlink pilot signals to the plurality of receiver terminals using analog beamforming;

wherein the further feedback information is received in response to transmitting the downlink pilot signals, and wherein the further feedback information includes a respective effective channel vector from each respective receiver terminal, the effective channel matrix being formed using the effective channel vectors.

* * * * *